United States Patent [19]
Dickens, Jr. et al.

[11] Patent Number: 5,648,450
[45] Date of Patent: Jul. 15, 1997

[54] SINTERABLE SEMI-CRYSTALLINE POWDER AND NEAR-FULLY DENSE ARTICLE FORMED THEREIN

[75] Inventors: Elmer Douglas Dickens, Jr., Richfield; Biing Lin Lee, Broadview Heights, both of Ohio; Glenn Alfred Taylor, Houston, Tex.; Angelo Joseph Magistro, Brecksville; Hendra Ng, E. Cleveland, both of Ohio; Kevin P. McAlea; Paul F. Forderhase, both of Austin, Tex.

[73] Assignee: DTM Corporation, Austin, Tex.

[21] Appl. No.: 664,356

[22] Filed: Jun. 17, 1996

Related U.S. Application Data

[63] Continuation-in-part of Ser. No. 298,076, Aug. 30, 1994, Pat. No. 5,527,877, which is a continuation-in-part of Ser. No. 980,004, Nov. 23, 1992, Pat. No. 5,342,919.

[51] Int. Cl.⁶ ........................................ C08G 69/14
[52] U.S. Cl. .................. 528/323; 156/62.2; 264/122; 264/125; 264/308; 264/497; 428/308.4; 428/317.9; 428/325; 521/145; 521/919; 523/201; 523/205; 523/206; 525/902; 528/310
[58] Field of Search ........................... 528/323, 310; 156/62.2; 264/122, 125, 308, 497; 428/308.4, 317.9, 325; 521/145, 919; 523/201, 205, 206; 525/902

[56] References Cited

U.S. PATENT DOCUMENTS

| | | | |
|---|---|---|---|
| Re. 28,361 | 3/1975 | Hahn | 117/16 |
| 3,591,409 | 7/1971 | Aubrey et al. | 117/100 |
| 4,247,508 | 1/1981 | Housholder | 264/219 |
| 4,863,538 | 9/1989 | Deckard | 156/62.2 |
| 4,938,816 | 7/1990 | Beaman et al. | 156/62.2 |
| 4,944,817 | 7/1990 | Bourell et al. | 156/62.2 |
| 5,017,317 | 5/1991 | Marcus | 264/81 |
| 5,034,432 | 7/1991 | Ueno et al. | 523/221 |
| 5,063,183 | 11/1991 | Taniguchi et al. | 501/96 |
| 5,076,869 | 12/1991 | Bourell et al. | 156/62.2 |
| 5,132,143 | 7/1992 | Deckard | 264/25 |
| 5,147,587 | 9/1992 | Marcus et al. | 264/22 |
| 5,155,321 | 10/1992 | Grube et al. | 219/121.6 |
| 5,155,324 | 10/1992 | Deckard et al. | 219/121.64 |
| 5,156,697 | 10/1992 | Forderhase et al. | 264/22 |

(List continued on next page.)

FOREIGN PATENT DOCUMENTS

| | | |
|---|---|---|
| 89065403 | 7/1987 | Japan. |
| 8802677 | 4/1988 | WIPO. |
| 9301258 | 1/1993 | WIPO. |
| 9412340 | 6/1994 | WIPO. |

OTHER PUBLICATIONS

The Sinterstation 2000 System Selective Laser Sintering Guide to Materials —Polycarbonate, DTM Corporation Technical Manual, Feb. 1993.

(List continued on next page.)

*Primary Examiner*—Terressa Mosley
*Attorney, Agent, or Firm*—Vinson & Elkins L.L.P.

[57] ABSTRACT

A laser-sinterable powder product has been prepared having unique properties which allow the powder to be sintered in a selective laser sintering machine to form a sintered part which is near-fully dense. For most purposes, the sintered part is indistinguishable from another part having the same dimensions made by isotropically molding the powder. In addition to being freely flowable at a temperature near its softening temperature, a useful powder is disclosed that has a two-tier distribution in which substantially no primary particles have an average diameter greater than 180 μm, provided further that the number average ratio of particles smaller than 53 μm is greater than 80%, the remaining larger particles being in the size range from 53 μm to 180 μm. A powder with slow recrystallization rates, as evidenced by non-overlapping or slightly overlapping endothermic and exothermic peaks in their differential scanning calorimetry characteristics for scan rates of on the order of 10° C. to 20° C. per minute, will also result in sintered parts that are near-fully dense, with minimal dimensional distortion.

70 Claims, 11 Drawing Sheets

U.S. PATENT DOCUMENTS

| | | | |
|---|---|---|---|
| 5,182,170 | 1/1993 | Marcus et al. | 428/551 |
| 5,185,108 | 2/1993 | Shimandle | 264/25 |
| 5,252,264 | 10/1993 | Forderhase et al. | 264/22 |
| 5,304,329 | 4/1994 | Dickens, Jr. et al. | 264/25 |
| 5,342,919 | 8/1994 | Dickens, Jr. et al. | 528/823 |
| 5,385,780 | 1/1995 | Lee | 428/325 |
| 5,431,967 | 7/1995 | Manthiram et al. | 427/555 |
| 5,527,877 | 6/1996 | Dickens, Jr. et al. | 528/323 |

OTHER PUBLICATIONS

The Sinterstation 2000 System Guide to Materials —Wax, DTM Corporation Technical Manual, Dec. 1992.

"DTM Strengthens Materials Offerings With Composite Nylon", Horizons, DTM Corporation, vol. 1, No. 1, Summer 1995, 4 pages.

"Solid Freeform–Fabrication: Powder Processing", Ceramic Bulletin, vol. 69, No. 6 1990, pp. 1030–1031.

The Sinteration 2000 System Selective Laser Sintering Guide to Materials, DTM Corporation Technical Manual, Dec. 1992.

"The Leader in Rapid Phototyping and Rapid Manufacturing Solutions", DTM Corporation Product Brochure, 1995, 8 pages.

Letter to Helmut Keidl from Scott Killian, Customer Support Manager, DTM Corporation, Mar. 24, 1995, 2 pages.

"From Computer to Component in 15 Minutes: The Integrated Manufacture of Three–Dimensional Objects", Marcus et al., JOM, Apr. 1990, pp. 8–10.

"A Model for Partial Viscous Sintering", Sun et al., Solid Freeform Fabrication Symposium Proceedings, Sep. 1991, The University of Texas at Austin, pp. 46–55.

"Models for the Prediction of the Thermal Conductivities of Powders", Xue et al., Solid Freeform Fabrication Symposium Proceedings, Sep. 1991, The University of Texas at Austin, 12 pages.

"The Selective Laser Sintering Process", DTM Corporation Brochure, Copyright material, pp. 1–8.

"Same–day prototyping blossoms", Plastics World, Dec. 1989, p. 11.

"Rapid prototyping: parts without tools", Aerospace America, Aug. 1991, pp. 18–23.

"The Selective Laser Sintering Process: Applications of a New Manufacturing Technology", Luke L. Kimble, Intelligent Design and Manufacturing For Prototyping, ASME 1991, PED–vol. 50, pp. 73–80.

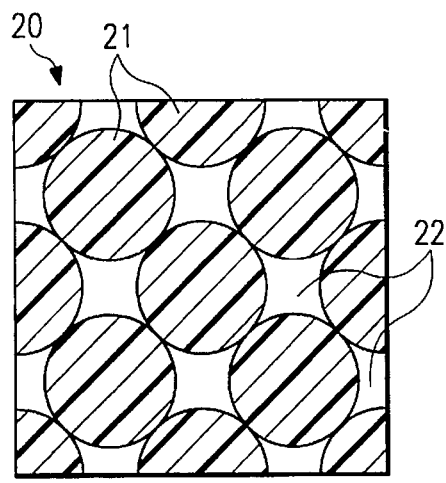
FIG. 1
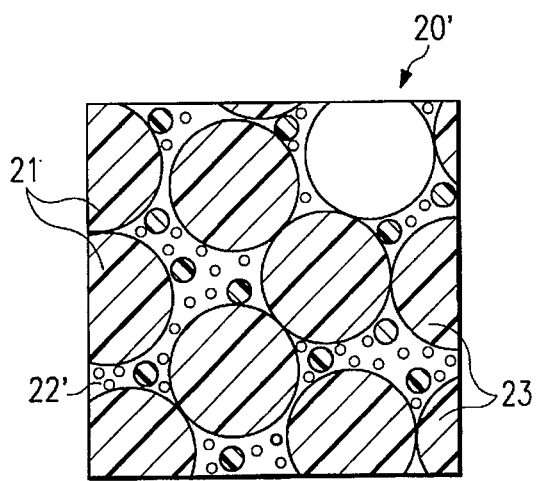
FIG. 2
FIG. 3
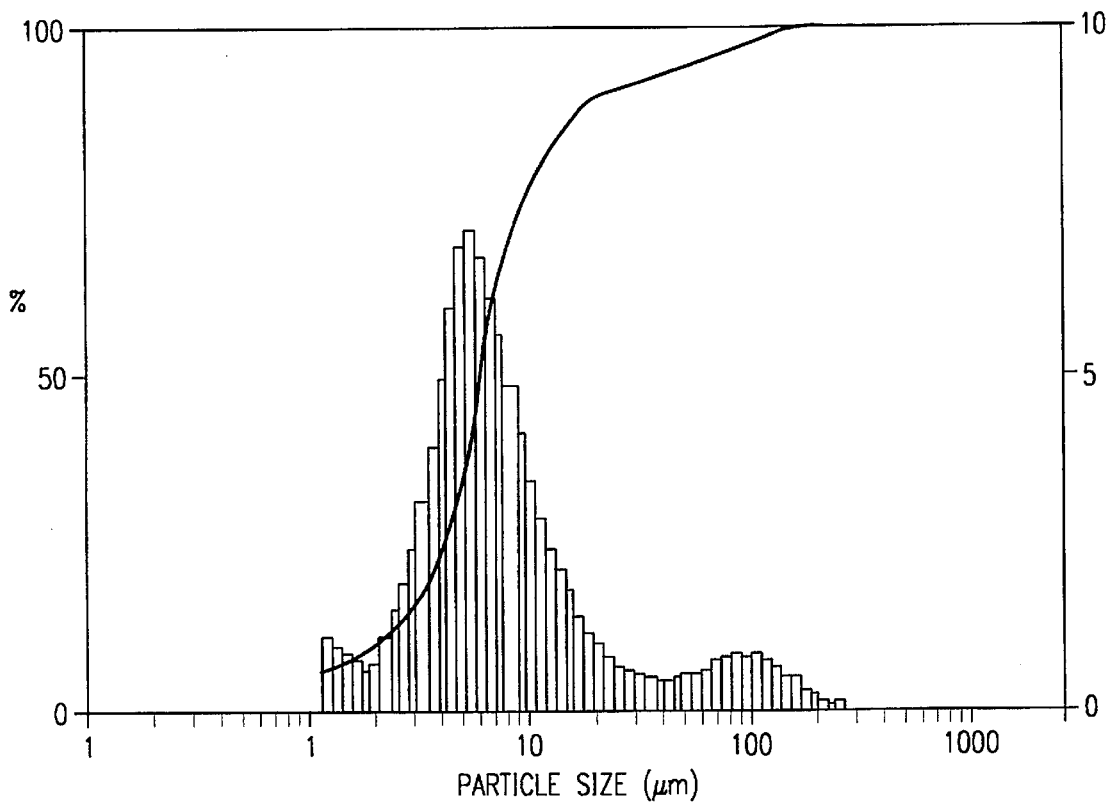

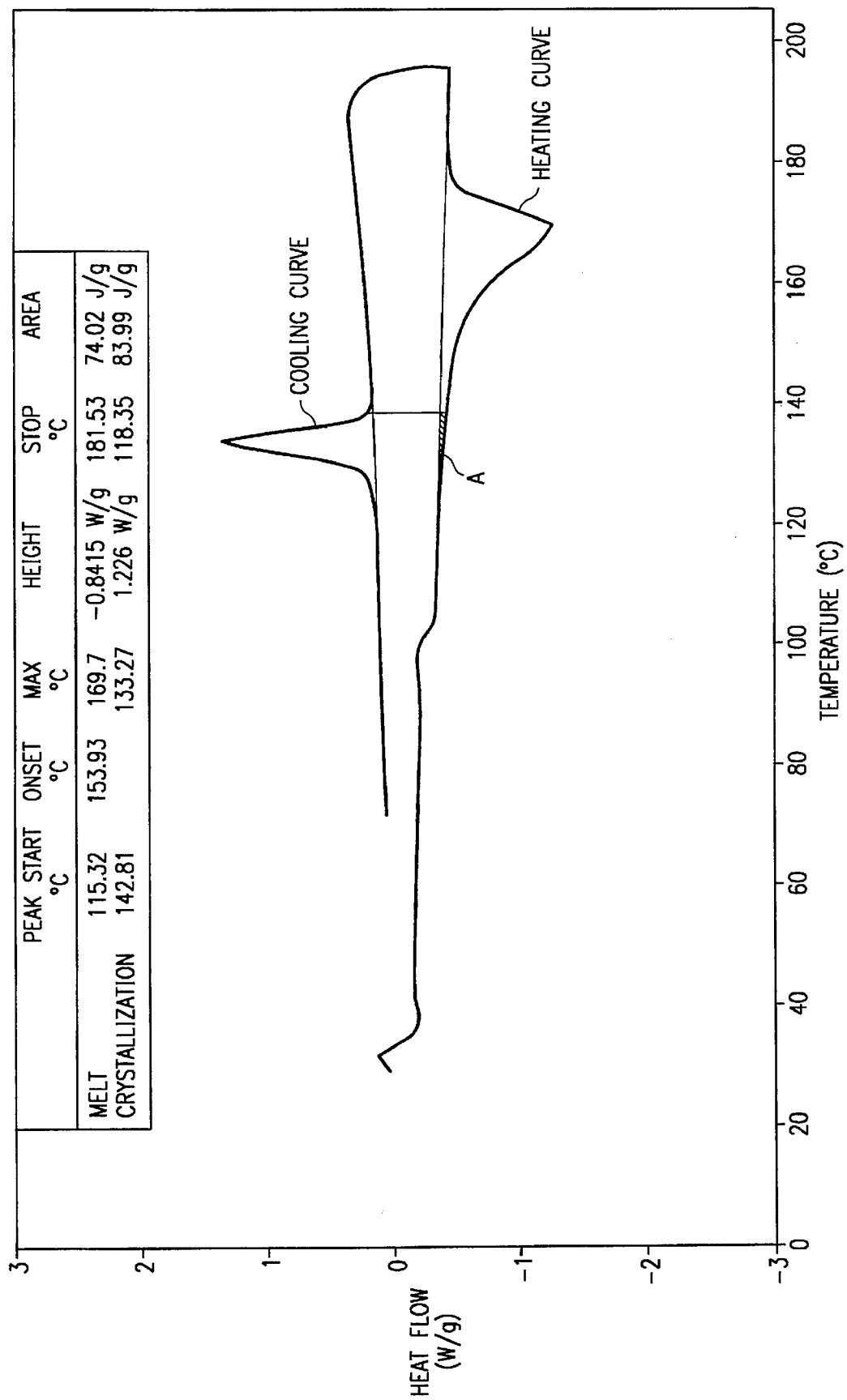

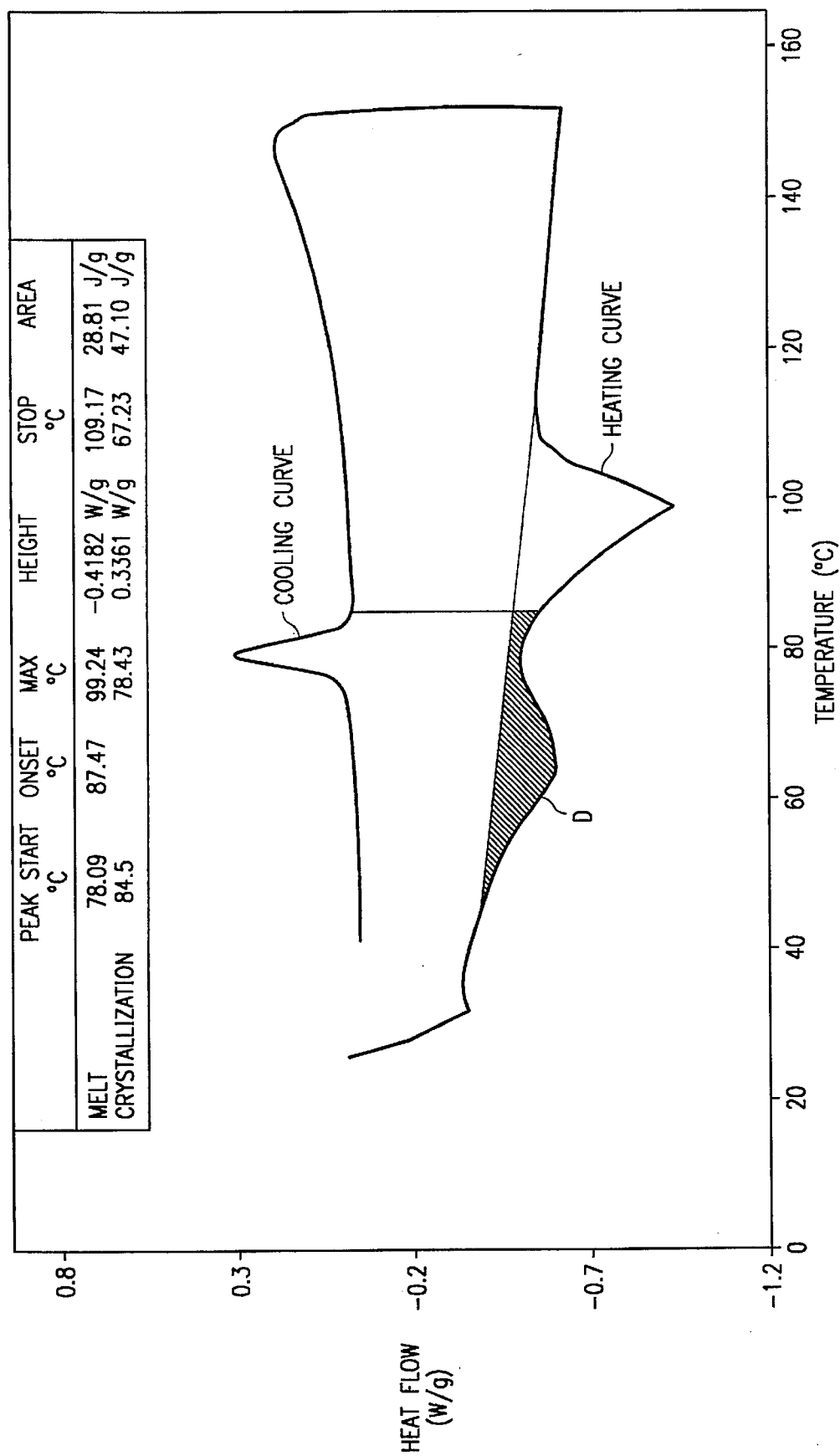

SINTERABLE SEMI-CRYSTALLINE POWDER AND NEAR-FULLY DENSE ARTICLE FORMED THEREIN

This application is a continuation-in part of commonly assigned application Ser. No. 08/298,076, filed Aug. 30, 1994, now U.S. Pat. No. 5,527,877 which is a continuation-in-part of commonly assigned application Ser. No. 07/980,004, filed Nov. 23, 1992, now U.S. Pat. No. 5,342,919.

This invention is in the field of rapid prototyping, and is more particularly directed to materials for producing prototype parts by way of selective laser sintering.

BACKGROUND OF THE INVENTION

This invention relates to a synthetic resinous powder product to be laser-sintered in a selective laser sintering machine, such as a SINTERSTATION 2000 system manufactured and sold by DTM Corporation. The laser-sinterable powder (referred to as "sinterable powder" herein) is "designed" or "tailored" to incorporate specific physical properties uniquely adapted to form a bed (of powder) upon which a sintering laser in the infra-red region is directed.

Prior art sinterable powders are unable to yield a sintered part which, for most purposes, appears to be a duplicate of one which is isotropically molded. Moreover, conventional sinterable powders form a bed which generally lacks the ability to provide the exigent heat transfer characteristics which determine whether a sintered part will be distorted, even if it is successfully completed. Since a layer of particles typically rolled out of the feed bed and onto the part bed of a selective laser sintering machine, is about 8 mils (200 μm) such powders used had a maximum particle diameter which was less than 200 μm and whatever "fines" were generated in the course of grinding the powder to the desired mesh size, irrespective of the distribution of particle sizes in the powder.

It has been observed that the selective laser sintering of amorphous polymer powders typically results in finished parts that are somewhat porous. Typical amorphous polymers exhibit a second order thermal transition at a temperature that is commonly referred to as the "glass transition" temperature, and also exhibit a gradual decrease in viscosity when heated above this temperature. In the selective laser sintering of amorphous polymers, the part bed is maintained at a temperature near the glass transition temperature, with the powder being heated by the laser at the part locations to a temperature beyond the glass transition temperature to produce useful parts, since viscosity controls the kinetics of densification. While it may be at least theoretically possible to build fully dense (i.e., non-porous) parts from amorphous polymers, practical considerations arising from the use of high power lasers, such as thermal control, material degradation, and growth (undesired sintering of powder outside of the scanned regions) have prevented the production of such fully dense parts. Further, it has been observed that the selective laser sintering of amorphous polymer powders is also vulnerable to "in-build curl", where subsequent sintered layers added to the part shrink onto the solid substrate, causing the part to warp out of the part bed.

The sinterable powders of the present invention are directed to yielding a sintered article ("part") which, though porous, not only has the precise dimensions of the part desired, but also is so nearly fully dense (hence referred to as "near-fully dense") as to mimic the flexural modulus and maximum stress at yield (psi), of the article, had it been fully dense, for example, if it had been isotropically molded.

In addition, the properties deliberately inculcated in the sinterable powder are unexpectedly effective to provide the bed with sufficient porosity to permit cooling gas to be flowed downwardly through it, yet maintaining a quiescent bed in which the sintered part mimics the properties of a molded article.

The term "near-fully dense" refers to a slightly porous article which has a density in the range from 80%–95% (void fraction from 0.2 to as low as 0.05), typically from 85%–90% of the density (void fraction 0.15–0.1) of a compression molded article which is deemed to be fully dense.

The term "fully dense" refers to an article having essentially no measurable porosity, as is the case when an article of a synthetic resinous powder is compression (or injection) molded from a homogeneous mass of fluent polymer in which mass individual particles have lost their identity.

By a "quiescent bed" we refer to one upon the surface of which the particles are not active, that is, do not move sufficiently to affect the sintering of each layer spread upon a preceding slice sintered in the part bed. The bed is not disrupted by the downward flow of gas, so that the bed appears to be static.

To date, despite great efforts having been focussed on a hunt for the formulation of a sinterable powder which will yield a near-fully dense part, that formulation has successfully eluded the hunt. The goal is therefore to produce a mass of primary particles of a synthetic resin which has properties specifically tailored to be delivered by a roller to the "part bed" of a selective laser sintering machine, then sintered into a near-fully dense prototype of a fully dense article.

A powder dispenser system deposits a "layer" of powder from a "powder feed bed" or "feed bed" into a "part bed" which is the target area. The term "layer" is used herein to refer to a predetermined depth (or thickness) of powder deposited in the part bed before it is sintered.

The term "prototype" refers to an article which has essentially the same dimensions of a compression or injection molded article of the same material. The porous prototype is visually essentially indistinguishable from the molded article, and functions in essentially the same manner as the molded article which is non-porous or fully dense. The flexural modulus, flexural strength and flexural elongation at yield, are essentially indistinguishable from the values obtained for a molded article. One is distinguishable from the other only because the prototype has a substantially lower, typically less than one-half, the ultimate tensile elongation (%), and notched Izod impact (ft-lb/in), than a compression molded article, though the prototype's tensile modulus, tensile strength, and elongation at yield are substantially the same as those of the compression molded article (see Table 1 hereinbelow). In Table 1, the values given in square brackets are the standard deviations under the particular conditions under which the measurements were made.

The tensile elongation, ultimate (%), and notched Izod impact are lower for the prototype because of its slight porosity. Therefore the energy to break, which is the area under the stress curve up to the point of break at ultimate elongation, is also very much lower than that for the compression molded article. As is well known, any small imperfections in a homogeneous article will be reflected in the ultimate tensile elongation and notched Izod impact. However, confirmation that the molded article has been closely replicated is obtained by a comparison of the fracture surfaces of the prototype and of the molded article. Photomicrographs show that these fracture surfaces of the prototype are visually essentially indistinguishable from fracture surfaces of an isotropically molded non-porous part except for the presence of a profusion of cavities having an average diameter in the range from 1 μm–30 μm randomly scattered throughout said part, indicating similar creep and fatigue characteristics. As one would expect, the cavities provide evidence of the porosity of the prototype. Therefore it is fair to state that, except for the lower ultimate elongation or Izod impact of the prototype, due to its slight porosity, the prototype fails in the same manner as the molded article.

A laser control mechanism operates to direct and move the laser beam and to modulate it, so as to sinter only the powder disposed within defined boundaries (hence "selectively sintered"), to produce a desired "slice" of the part. The term "slice" is used herein to refer to a sintered portion of a deposited layer of powder. The control mechanism operates selectively to sinter sequential layers of powder, producing a completed part comprising a plurality of slices sintered together. The defined boundaries of each slice corresponds to respective cross-sectional regions of the part. Preferably, the control mechanism includes a computer—e.g. a CAD/CAM system to determine the defined boundaries for each slice. That is, given the overall dimensions and configuration of the part, the computer determines the defined boundaries for each slice and operates the laser control mechanism in accordance with the defined boundaries for each slice. Alternatively, the computer can be initially programmed with the defined boundaries for each slice.

The part is produced by depositing a first portion of sinterable powder onto a target surface of the part bed, scanning the directed laser over the target surface, and sintering a first layer of the first portion of powder on the target surface to form the first slice. The powder is thus sintered by operating the directed laser beam within the boundaries defining the first slice, with high enough energy (termed "fluence") to sinter the powder. The first slice corresponds to a first cross-sectional region of the part.

A second portion of powder is deposited onto the surface of the part bed and that of the first sintered slice lying thereon, and the directed laser beam scanned over the powder overlying the first sintered slice. A second layer of the second portion of powder is thus sintered by operating the laser beam within the boundaries which then define the second slice. The second sintered slice is formed at high enough a temperature that it is sintered to the first slice, the two slices becoming a cohesive mass. Successive layers of powder are deposited onto the previously sintered slices, each layer being sintered in turn to form a slice.

Repetition of the foregoing steps results in the formation of a laser-sintered article lying in a "part bed" of powder which continually presents the target surface. If the particles of powder at the boundaries of each layer are overheated sufficiently to be melted, unmelted particles immediately outside the boundaries adhere to the molten particles within, and the desired sharp definition of the surface of the sintered article is lost. Without sharp definition at the boundaries, the article cannot be used as a prototype.

Particles of powder adjacent the surfaces of the article to be formed should resist being strongly adhered to those surfaces. When particles are not so strongly adhered they are referred to as "fuzz" because fuzz is easily dislodged from the surface, manually, and the dislodged particles retain most of their individual identities. Particles so tightly adhered to the surface as to be removed satisfactorily only with a machining step, are referred to as "growth". Such growth makes a sintered part unfit for the purpose at hand, namely to function as a prototype for a compression molded part.

A method for sintering a powder into a shaped article in a selective laser sintering machine is disclosed in U.S. Pat. No. 4,247,508 to Housholder; U.S. Pat. Nos 4,863,538 and 5,132,143 to Deckard; U.S. Pat. No. 4,938,816 to Beaman et al.; and, U.S. Pat. No. 4,944,817 to Bourell et al., the relevant disclosure of each of which is incorporated by reference thereto as if fully set forth herein. "Sintering" is defined as the heating of the powder to a temperature which causes viscous flow only at contiguous boundaries of its particles, with at least some portion of substantially all particles remaining solid. Such sintering causes coalescence of particles into a sintered solid mass the bulk density of which is increased compared to the bulk density of the powder particles before they were sintered; and, a part formed by "slice-wise" joining of plural vertically contiguous layers which are sintered into stacked "slices" is therefore said to be autogenously densified. A layer of powder is confined by vertically spaced apart horizontal planes, no more than about 250 μm apart and each slice is typically in the range from 50 μm to 180 μm thick.

A specific goal of this invention is to produce a sinterable powder of a single, that is, unblended, synthetic resin the molecular weight range and molecular weight distribution of which may be controlled to produce a powder which, when exposed to the laser beam, is heated so that the outer portions of each particle have a narrowly defined range of viscosity which results in the fusion of successive slices.

It must be remembered that before the powder can be sintered in the part bed, it must be delivered from the feed bed to the part bed upon which the powder is distributed in a thin, even layer about 125 μ thick, by the roller of the selective laser sintering machine. Each distributed layer should be thin and evenly distributed because the temperature gradient through the cross-section of the sintered slice must be small, typically <5° C., more preferably <2° C., and most preferably <1° C. To meet this demanding criterion, the powder must be freely flowable from the feed bed onto the part bed.

By "freely flowable" we refer to a mass of small particles, the major portion of which, and preferable all of which have a sphericity of at least 0.5, and preferably from 0.7 to 0.9 or higher, so that the mass tends to flow steadily and consistently as individual particles. Though such flow is conventionally considered a characteristic of a powder which flows through an orifice slightly larger than the largest particle, such flow (through an orifice) is of less importance than the ability of the powder to be picked up in the nip of a rotating roller and transported by it as an elongated fluent mass of individual particles urged along by the roller. A freely flowable powder has the property of being able to be urged as a dynamic elongated mass, referred to as a "rolling bank" of powder, by the rotating roller, even at a temperature near $T_s$ the "softening point" of the powder.

At $T_s$, the powder is on the verge of not being flowingly transportable as a rolling bank against a rotating roller. By "softening point" we refer to $T_s$, at which a powder's storage modulus ($G'_s$) has decreased substantially from its value of G' at room temperature. At or above $T_s$ the storage modulus $G'_s$ of a sintered slice of the powder is low enough so as not to let it "curl". By "curl" we refer to the slice becoming non-planar, one or more portions or corners of the slice rising more than about 50 μm above the surface of the last (uppermost) slice in the horizontal x-y-plane.

A slice will curl when there is a too-large mismatch between the temperature of the initial slice sintered by the laser and the bed of powder on which it lies; or, between powder freshly spread over a just-sintered slice and the temperature at the upper interface of the slice and the freshly spread powder. Such a mismatch is the result of "differential heating". The importance of countering curl is most critical when the first slice is formed. If the first slice curls, the roller spreading the next layer of powder over the slice will push the slice off the surface of the part bed.

If the powder is transported from the feed bed to the part bed in which a hot slice is embedded, and the temperature at the interface $T_i$ between the hot upper surface of the slice and the freshly spread powder is high enough to raise the temperature of the freshly spread powder above $T_s$, this powder cannot be rollingly distributed over the hot slice because the powder sticks and smears over the hot slice. The indication is that the slice is too hot.

If the powder in the feed bed is too cool, that is, so cool that the equilibrium temperature on the surface of the hot, embedded slice is such that the temperature of the freshly spread powder is below $T_s$, the slice will curl.

The slice will not curl when the powder spread over it reaches an equilibrium temperature at the interface, and the equilibrium temperature is at or above $T_s$. the precise temperature $T_i$ at the interface is difficult to measure, but to form successive slices cohesively sintered together, the temperature of the powder at the interface must be above $T_s$, but below the powder's "sticky point" or "caking temperature" $T_c$ at which the powder itself will not flow.

By "sticky" we infer that the force required to separate contiguous particles has exceeded an acceptable limit for the purpose at hand. This caking temperature $T_c$ may be considered to be reached when a critical storage modulus $(G'_s)$ of the powder has been reached or exceeded. The storage modulus is a property of the powder akin to a material's tensile strength and can be measured directly with a Rheometrics dynamic mechanical analyzer.

To form a sintered part in a selective laser sintering machine, an initial slice is sintered from powder held in the part bed at near $T_s$ but well below $T_c$. By "near $T_s$" we refer to a temperature within about 5° C. of $T_s$, that is $T_s \pm 5$, preferably $T_s \pm 2$.

Immediately after the initial slice is formed, the slice is much hotter than the powder on which it rests. Therefore a relatively cool powder, as much as about 40° C., but more typically about 20° C. below its $T_s$, may be spread over the hot slice and the interface temperature raises the temperature of the powder to near $T_s$. As the powder is spread evenly over the hot slice it is to remain cool enough to be spread, but soon thereafter, due to heat transfer at the interface, must reach or exceed $T_s$, or the just-sintered slice will curl; that is, the temperature of the powder preferably enters the "window of sinterability". This window may be measured by running two DSC (differential scanning calorimetry) curves on the same sample of powder, sequentially, with a minimum of delay between the two runs, one run heating the sample past its melting point, the other run, cooling the sample from above its melting point until it recrystallizes. The difference between the onset of melting in the heating curve, Tm, and the onset of supercooling in the cooling curve, Tsc, is a measure of the width of the window of sinterability (see FIG. 6).

To ensure that the powder from the feed bed will form a rolling bank even when it is rolled across the hot slice, the powder is usually stored in the feed bed at a storage temperature in the range from 2° C. to 40° C. below the powder's $T_s$ and transferred at this storage temperature to the part bed, the feed bed temperature depending upon how quickly a layer of powder spread over a just-sintered slice enters the window of sinterability. The $T_s$ may be visually easily obtained—when the powder is too hot to form a rolling bank, it has reached or exceeded its $T_s$.

It will now be realized that the cooler the powder (below $T_s$) the higher the risk of curling, if the interface temperature is not high enough to raise the temperature of the layer of powder at least to $T_s$. A commensurate risk accrues with a powder stored at too high a temperature. The storage temperature is too high, though the powder forms a rolling bank, when the powder smears or sticks as it traverses the slice, an indication that the powder overlying the slice has not only exceeded $T_s$ but also reached (or gone beyond) $T_c$.

Thus, though it is difficult to measure the interface temperature, or to measure $T_c$ with a temperature probe, so as to measure the width of the window, it can be done visually. When the rolling bank of powder sticks or smears over the last-sintered slice, the $T_c$ of the powder has been reached or exceeded. Thus with visual evidence once can determine the temperature range $(T_c - T_s)$ which is the window of sinterability or the "selective laser sintering operating window", so referred to because the powder cannot be sintered successfully at a temperature outside this selective-laser-sintering-window. (see FIG. 6).

At the start of a sintering cycle it is best to maintain the temperature of the upper layer of the part bed at $T_s$, preferably 0.5°–2° C. above $T_s$ so that the uppermost layer is presented to the laser beam in the selective-laser-sintering-window. After the first slice is formed, feed is rolled out from the feed bed at as high a temperature as will permit a rolling bank of powder to be transferred to the part bed. The most desirable powders are freely flowable in a rolling bank at a temperature only about 5° C. below their $T_s$.

However, as the mass of the sintered slices accumulates in the part bed, the sintered mass provides a large heat sink which transfers heat to each layer of powder freshly spread over the hot mass, thus allowing a relatively cool powder, as much as 30° C., more typically 20° C., lower than $T_s$ to be transferred from the feed bed, yet quickly come to equilibrium in the selective-laser-sintering-window as the layer is spread over the last preceding slice. Thus, when each layer is sintered, the later-formed slices will not curl.

It is important that the powder be "freely flowable" from the feed bed, preferably at a temperature sufficiently near $T_s$ to ensure that the last-sintered slice will not curl when the powder is spread upon it. As already pointed out above, if the first slice formed curls, no further progress can be made. A fresh start must be made to sinter the part.

A powder is not freely flowable when the temperature at which it is held or distributed exceeds its softening point. The powder cakes and does not flow at all when the caking temperature is reached. For example, one may consider that at $T_c$, $G'_s$ decreases to a critical $G'_c$, in which case the caking temperature $T_c$ may also be referred to as the "$G'_c$ temperature".

It is possible to transfer powder from the feed bed to the part bed at above $T_s$ if the impaired flowability allows one to do so, and the risk of operating too close to $T_c$ is acceptable. Generally a powder does not form a rolling bank at or above its $T_s$.

According to one aspect of the invention, it is preferred that the powder used in the selective laser sintering process be sinterable in a wide selective-laser-sintering-window.

Though within narrow limits, the 'width' (in °C.) of the window, varies from the start of the cycle and at the end (particularly when a large part is formed, as explained above). The width of the window also varies depending upon the composition of the powder. This width ranges from about 2° C. to about 25° C.; more typically, it is about 5° C.–15° C. With a powder which is freely flowable over a wide temperature range, one is able to form, in the best mode, a solid, near-fully dense article when the powder is sintered in a selective laser sintering machine which uses a roller to spread the powder.

The temperature at which $G'_s$ is measured is believed to not be critical, provided the $G'_c$ temperature offers an adequately large selective-laser-sintering-window. Most desirable laser-sinterable powders have an unexpectedly common characteristic, namely that the value of their $G'_c$ is narrowly defined in the range from $1\times10^6$ dynes/cm$^2$ to $3\times10^6$ dynes/cm$_2$.

For a crystalline powder (100% crystallinity), the softening point is its melting point Tm. Therefore $G'_s$ and $G'_c$ are essentially identical and there is no G'-window. For an amorphous powder, its softening point is its initial glass transition temperature Tg. An amorphous powder can offer a large window of sinterability but because its viscosity decreases too slowly as temperature increases and the $G'_c$ limit of the selective-laser-sintering-window is approached, the viscosity is still too high. That is, the viscosity is too high to allow requisite interchain diffusion at the boundaries of the particles without melting the entire particle. Therefore an amorphous powder is difficult to sinter to near-full density, so that powders which qualify as the product of this invention are semi-crystalline powders such as nylon, polybutylene terephthalate (PBT) and polyacetal (PA) which provide signs of crystalline order under X-ray examination, and show a crystalline melting point Tm as well as a glass transition temperature Tg. Because the crystallinity is largely controlled by the number and distribution of branches along the chain, the crystallinity varies, bulky side chains or very long chains each resulting in a reduction of the rate of crystallization. Preferred polymers have a crystallinity in the range from 10%–90%, more preferably from 15%–60%.

To summarize, the selective laser sintering process is used to make 3-D objects, layer-upon-layer sequentially and in an additive manner. The process is more fully described in the '538 Deckard patent and comprises the following steps:

(1) Powder from the feed bed is "rolled out" by a roller, to a part bed where the powder is deposited and leveled into a thin layer, typically about 125 μm (0.005") in depth.

(2) Following a pattern obtained from a two dimensional (2-D) section of a 3-D CAD model, a CO2 laser "sinters" the thin layer in the target region of the part bed and generates a first slice of sintered powder in a two-dimensional ("2-D") shape. Directions for the pattern, and each subsequent pattern for successive slices corresponding to a desired three-dimensional ("3-D") prototype are stored in a computer-controller. It is critical for a slice-upon-slice construction of the prototype that the laminar, planar shape of each slice of sintered powder be maintained, that is, "without curling".

(3) A second layer of powder from the feed bed is then deposited and leveled over the just-sintered layer in the part bed, forming a second slice sintered to the first slice.

(4) The computer-controller makes incremental progress to the next 2-D section, the geometry of which is provided from the 3-D model, and instructs the laser/scanner system to sinter the regions of the bed desired for successive 2-D sections.

(5) Still another layer of powder is deposited from the feed bed and leveled over the just-sintered layer in the part bed.

(6) The foregoing steps are repeated, seriatim, until all layers have been deposited and sequentially sintered into slices corresponding to successive sections of the 3-D model.

(7) The sintered 3-D object is thus embedded in the part bed, supported by unsintered powder, and the sintered part can be removed once the bed has cooled.

(8) Any powder that adheres to the 3-D prototype's surface as "fuzz" is then mechanically removed.

(9) The surfaces of the 3-D prototype may be finished to provide an appropriate surface for a predetermined use.

This invention relates mainly to producing and using a powder which is designed to satisfy the requirements of the first three steps of the process.

Although we have experimentally processed many synthetic resinous powders in the selective laser sintering machine, we have found that few make near-fully dense parts. In most cases the measured values of flexural modulus and maximum stress at yield are at least 30% lower than values obtained made by injection or compression molding the same part. We now understand, and have set forth below, what properties are required of a powder which can be successfully sintered in a selective laser sintering machine, and have accepted, at least for the time being, the many disappointing results we obtained with amorphous polymers such as polycarbonate (PC) and acrylonitrile-butadiene-styrene resins (ABS).

It has now become evident that a semi-crystalline or substantially crystalline organic polymer is the powder of choice if it is to provide the high definition of surface ("lack of growth") which a prototype made from the tailored powder of this invention, provides.

By a "semi-crystalline polymer" or "substantially crystalline polymer" is meant a resin which has at least 10% crystallinity as measured by DSC, preferably from about 15–90%, and most preferably from about 15–60% crystallinity.

U.S. Pat. No. 5,185,108, issued Feb. 9, 1993, incorporated herein by this reference, teaches that to produce a sintered article of wax having a void fraction (porosity) of 0.1, a two-tier weight distribution of wax particles was necessary. The desired two-tier distribution was produced by a process which directly generated a mass of wax microspheres such that more than half (>50%) the cumulative weight percent is attributable to particles having a diameter greater than a predetermined diameter (100 μm is most preferred for the task now at hand) for the particular purpose of packing at least some, and preferably a major portion of the interstitial spaces between larger particles, with smaller ones.

The two-tier distribution described in U.S. Pat. No. 5,185,108 was arrived at by recognizing that the densest packing of uniform spheres produces a void fraction (porosity) of 0.26 and a packing fraction of 0.74 as illustrated in FIG. 1; and further, by recognizing that the packing factor may be increased by introducing smaller particles into the pore spaces among the larger spheres. As will be evident, the logical conclusion is that the smaller the particles in the pore spaces, the denser will the packed powder (as illustrated in FIG. 2), and the denser will be the part sintered from the powder.

As will further be evident, the greater the number of small particles relative to the large, in any two-tier distribution, the denser will be the part. Since the goal is to provide a near-fully dense part, logic dictates that one use all small particles, and that they be as small as can be.

However, a mass of such uniformly small particles is not freely flowable. To make it freely flowable one must incorporate larger particles into the mass, much in the same manner as grains of rice are commonly interspersed in finely ground table salt in a salt shaker. Therefore, the tailored powder is a mixture of relatively very large and relatively very small particles in a desirable two-tier particle size distribution for the most desirable sinterable powders.

The demarcation of size in the two-tier distribution and the ratio of the number of small particles to the number of large particles, set forth hereinbelow, are both dictated by the requirements of the selective laser sintering machine.

Further it was found that the rate of heat transfer into the mass of a small particle is so much higher than that into the mass of a large particle, that one could not know either just how large the particles in the upper tier should be, nor how many of such large particles could be present. If the heat transfer to small particles in the bed adjacent the boundaries of each layer was too high, unacceptable growth is generated. If the heat transfer is not high enough, the large particles, namely those >53 μm, in the layer are not sintered, thus forming a defective slice. It is because essentially all these large particles are sintered without being melted, and a substantial number of the small particles <53 μm are melted sufficiently to flow into and fill the interstices between sintered large particles, that the finished sintered part is near-fully dense. Under successful sintering conditions to form a near-fully dense part, the temperature of the powder must exceed $T_s$ in less time than is required to melt the large particles >53 μm. If the time is too long, large particles will melt and there will be growth on the surfaces of the part; if the time is too short, all the large particles are not sintered. Thus the large particles not only help form a rolling bank, but also fill an important role to maintain the desired transient heat transfer conditions.

It has been found that only a substantially crystalline powder which does not melt sharply, lends itself to the purpose at hand, and only when the powder is stripped of substantially all too-large particles (termed "rocks") larger than 180 μm (80 mesh, U.S. Standard Sieve Series). By "substantially all" we mean that at least 95% of the number of "rocks" in the powder are removed.

It has further been found that a laser-sinterable powder in the proper size range of from about 1 μm–180 μm, may, according to one aspect of the invention, be specified by (i) narrowly defined particle size range and size in a two-tier distribution, and, (ii) the "selective-laser-sintering-window".

According to another aspect of the invention to be described in detail hereinbelow, it has now been realized that the two-tiered particle size distribution is not absolutely necessary in order to create a distortion-free fully dense part in the selective laser sintering process, provided that the recrystallization rate of the material is sufficiently low.

Referring to the first aspect of the invention noted above, the unexpected effect of using the tailored powder with a defined selective-laser-sintering-window is supported by evidence of the sinterability of the powder in this window. The selective-laser-sintering-window is directly correlatable to the powder's fundamental properties defined by its $G'_c$ temperature.

More surprising is that, despite the much larger number of small particles than large in the part bed, it is possible to flow the stream of cooling gas (nitrogen) downwardly through the quiescent bed at low enough a pressure so as not to disturb the particles on and near the surface of the bed sufficiently to cause movement noticeable by the naked eye (hence referred to as "quiescent"). One would expect the pressure drop through a bed of very fine particles, more than 80% of which are smaller than 53 μm (270 mesh) to be relatively high. But the presence of the large particles, coupled with the fact that the powder is delivered from the feed bed and distributed evenly by a roller, rather than being pressed onto the bed, unpredictably provides the requisite porosity in the range from 0.4 to 0.55 to allow through-flow of a gas at superatmospheric pressure in the range from 103 kPa (0.5 psig) to 120 kPa (3 psig), preferably from 107–115 kPa (1–2 psig) with a pressure drop in the range from 3–12 kPa, typically 5–7 kPa, without disturbing a quiescent part bed 30 cm deep.

The part bed formed by the tailored powder is unique not only because its specific use is to generate laser-sintered parts, but because the bed's narrowly defined porosity and defined particle size provides "coolability". In operation, the powder in the part bed is heated by a multiplicity of hot sintered slices to so high a temperature that the powder would reach its caking temperature $T_c$ if the hot bed could not be cooled.

An identifying characteristic of a preheated 'part bed' of powder having a two-tiered distribution, with primary particles in the proper size range, stripped of rocks >180 μm, is that the bed is not too tightly packed to permit the flow of cooling gas through the bed. This characteristic allows the part bed to be maintained, during operation sintering a part, with a specified temperature profile which allows formation of a distortion-free sintered part as it is formed slice-wise; and also, after the sintered part is formed, and the part lies in the heated part bed. By "distortion-free" is meant that no linear dimension of the part is out of spec more than ±250 μm, and no surface is out of plane by more than ±250 μm (20 mils).

Though the importance of a two-tier particle size weight distribution was disclosed with respect specifically to wax particles in U.S. Pat. No. 5,185,108, it was not then realized that the ranges of particle sizes in each tier of the two-tier distribution controlled both, the density of the sintered part and the sinterability of the powder. Neither was it known that the distribution of particle sizes in a two-tier distribution was as critical as the viscosity characteristics of the material as a function of temperature.

The ranges of sizes in the two-tier distribution of particles used in the powder according to this aspect of the invention is different from the ranges of the two-tier distribution of the wax powder described in U.S. Pat. No. 5,185,108. Quite unexpectedly, the formation of a near-fully dense sintered part requires that at least 80% of the number of all particles in the bed are from 1 μm–53μ and that there be substantially no (that is, <5%) particles greater than 180 μm (80 mesh) in a part bed. The importance of the few "large particles" to maintain (i) free-flowability near $T_s$ and (ii) a predetermined temperature profile in a part bed while a sintered part is being formed, irrespective of the density of the part formed, to negate undesirable "growth" on the part, was not then known.

Because the "selective-laser-sintering-window" may be defined by the requirements of the selective laser sintering process, the part bed (and sometimes the feed bed) is heated to near $T_s$ to negate the proclivity of the sintered layer to "curl". To minimize the curling of a slice as it lies on a part bed, it has been discovered that a preferred temperature profile is to be maintained in the bed, with a slight but narrowly specified temperature gradient on either side of a horizontal zone through the portion of the bed occupied by the sintered part, referred to as the "hot" zone.

The typical gradient in a part bed in a selective laser sintering machine is first positive, that is, the temperature increases to a maximum, then the gradient is negative, that is the temperature decreases from the maximum. The upper temperature gradient in the upper portion of the bed is positive, that is the temperature increases until it reaches a maximum temperature $T_{max}$ in the hot zone. The lower temperature gradient in the lower portion of the bed is negative, that is the temperature decreases from $T_{max}$ in the hot zone to the bottom of the bed.

More specifically, the temperature in the upper portion of the bed progressively increases as one moves downward from the upper surface of the bed to $T_{max}$; then progressively decreases as one moves downward from $T_{max}$ to the bottom surface of the part bed, which surface is in contact with the bed-supporting piston.

The gradient in a conventional selective laser sintering machine without controlled gas-cooling of the part bed, in each direction is typically greater than 2° C./cm (5° C./in). Such a gradient was found to be too high to provide an acceptable risk of distortion of the part.

These considerations lead to temperature limits in the feed and part beds which limits define the G'-window and selective-laser-sintering-window, namely, (i) the temperature at which the part bed is maintained, and the temperature profile therein, and (ii) the temperature at which the feed bed is maintained.

In turn, the temperature at which the part bed is maintained is defined by (a) a lower (minimum) part bed temperature below which curling is so pronounced as to negate any reasonable probability of effecting a slice-wise fusion of plural vertically contiguous slices; and, (b) an upper (maximum) temperature at which interparticle viscosity in the part bed makes it so "sticky" as to fuzz (obfuscate) the predetermined boundaries of the part to be made. All sintered powder between vertically spaced apart lateral planes in the part bed is solidified sufficiently to have mechanical strength. The remaining unsintered powder remains freely-flowable.

The "improved" sinterable tailored powder provides not only the specified particle size and two-tier distribution, but also a usable and desirable selective-laser-sintering-window. The ability of a powder simultaneously to satisfy each of the requirements, provides a measure of how "good" the chance that a powder will be sinterable in the selective laser sintering process to yield a near-fully dense, but porous article.

A major practical consequence of the narrowly defined window requires that the part bed be maintained at a specified temperature and with a specified temperature profile so that each layer to be sintered lies within the confines of the selective-laser-sintering-window. A different temperature, whether higher or lower, and/or a different temperature profile, results in regions of the just-sintered initial slice of powder which will either cause a sintered slice to melt and be distorted in a layer of the part bed which has "caked"; or, will cause a sintered slice to curl if the part bed temperature is too low. In the past this has been an all too common occurrence with the result that an undesirable part was made. The tailored powder and unique bed which it forms now make production of an unacceptable part an uncommon occurrence.

SUMMARY OF THE INVENTION

A laser-sinterable semi-crystalline synthetic resinous powder (referred to as a "tailored powder"), having defined parameters of particle size distribution, molecular weight range, molecular weight distribution and crystallization characteristics is found to overcome the disadvantages of known powders used to form a sintered part in a selective laser sintering machine. The unexpected effect of providing a sinterable powder which has a defined selective-laser-sintering-window is evidenced in the ability to predict the sinterability of the powder with a laser generated at a wave-length which is absorbed sufficiently to heat particles of the powder to their critical storage modulus $G'_c$ when the outer portion of the particles have the viscosity required to be cohesively sintered.

According to a first aspect of the invention, the two-tier particle size distribution and the number average ratio of particles smaller than 53 µm be >80%, that is, more than 80% of all the particles in the powder be smaller than 53 µm, allow the powder to be freely flowable onto the part bed so as to be presented to the laser beam in the selective-laser-sintering-window, and also to form a bed of desired porosity which (i) allows passage of a low pressure inert cooling gas to keep the bed from overheating, and (ii) provides the desired absorption of infra-red energy from the laser beam to yield a near-fully dense slice. A specified temperature profile is maintained in the part bed with the flow-through inert cooling gas stream, but the tailored selective laser sintering powder is sintered with a conventional selective laser sintering protocol. The powder yields a sintered article which is porous but so near-fully dense that the porous article has strength characteristics which unexpectedly mimic (are substantially the same as) those of an isotropically molded, fully dense article of the same powder.

It is therefore a primary object of this invention to provide a near-fully dense part in a selective laser sintering machine, the part formed from a semicrystalline or substantially crystalline synthetic resinous sinterable powder having tailored properties uniquely adapted to the purpose at hand.

According to one aspect of this invention, it is a general object of this invention to provide a bed of tailored powder of a semi-crystalline unblended polymer having the following physical properties:

(a) a major portion by weight of the powder, and preferably essentially all the powder having a sphericity in the range from greater than 0.5 to 0.9, and a two-tier particle size distribution of primary particles having an average diameter smaller from than 180 µm, with substantially no particles >180 µm, provided further that the number average ratio of particles smaller than 53 µm is greater than 80%, preferably greater than 90%, and most preferably greater than 95%, the remaining particles being in the size range from 53 µm to 180 µm; a layer of the powder no more than 250 µm deep absorbs essentially all infra-red energy at the 10.6 µm wavelength beamed therethrough, and absorbs more than 50% of that energy in a layer no more than 180 µm thick;

(b) a crystallinity in the range from 10% to 90%, preferably from 15% to 60%, a number average molecular weight in the range from about 30,000 to 500,000, preferably 60,000–300,000, and a molecular weight distribution in the range from 1 to 5, preferably from 1.2 to 3; and, (c) a "selective-laser-sintering-window" in the temperature range from 2° C.–25° C. between the softening temperature $T_s$ of the powder and its "caking temperature" $T_c$, such that the powder has a "flow time" of <20 sec for 100 g in a funnel test (ASTM D1895-61T) at a temperature near $T_s$ in a range from 70° C. to 220° C., but below the powder's $T_c$; and, (d) a melt viscosity in the range from 100–10⁴ poise (10–1000 Pa-sec) when the temperature of the powder being sintered exceeds $T_c$ in less time than is required to melt contiguous large particles >53 µm.

The numerical value of the storage modulus $G'_s$ for the tailored powder is much lower than the value of $G'$ at room temperature, and the temperature at which $G'_s$ is measured is in preferably the range from 5° C. to 25° C. below the $G'_c$ temperature of the powder.

It is also a general object of this invention to provide a bed of tailored powder in a laser-sintering zone, the bed having the foregoing defined characteristics which are evidenced in:

(i) a "selective-laser-sintering-window" in the range from $T_s$ to $T_c$; and, (ii) a 'part bed' in which the sintered part is removably embedded while it dissipates heat to generate a temperature profile defined by sequential positive and negative temperature gradients, in a vertical plane through the part bed; such a gradient occurs when the uppermost slice is less than 250 µm thick, and is near $T_s$ of the powder, and the temperature of the sintered part is near $T_c$. Further, the gradient from the upper surface of the part bed to the maximum temperature in the horizontal zone in which the sintered part lies, is positive, the temperature increasing at a rate in the range from 0.2° C./cm (0.5° C./in) to 2° C./cm (5° C./in) of vertical depth; and, from the maximum temperature in the horizontal zone, to the bottom of the bed, the gradient is negative, the temperature decreasing at a rate in the range from 0.2° C./cm (0.5° C./in) to 2° C./cm (5° C./in).

It has also been discovered that the tailored powder which is free-flowing at an elevated temperature below its Tg or Tm, typically at from 30° C. below $T_c$, but with some powders, as little as 2° C., is uniquely adapted to yield, when sintered by a laser beam, a near-fully dense, laser-sintered article having a density in the range from 80%–95%, typically from 85%–90% of the density of a compression molded article which is deemed to be fully dense, and the mode of failure, when fractured in bending, is essentially identical to the mode of failure of an isotropically molded article of the same powder, except for cavities corresponding to the porosity of the sintered article. The sintered article may have some unsintered particles ("fuzz") adhering to its surface, but the fuzz is removable by lightly abrading the surface without changing the contours of the near-fully dense sintered article.

It is therefore another general object of this invention to produce a laser-sinterable polymer powder consisting essentially of an unblended polymer having substantially no particles >180 µm in a mass of particles in which the number average ratio of particles in the range from 1 µm–53 µm is greater than 80%, the remaining particles being in the size range from 53 µm to 180 µm; and, substantial crystallinity in the range from 25% to 95%, which provides a selective-laser-sintering-window of from 2° C. to 25° C., and which powder when sintered in a bed with a specified temperature profile, allows each layer of powder, in the range from about 50 µm (2 mil) to about 250 µm (10 mils) thick, to be sintered without curling.

It is a specific object of this invention to provide a laser-sinterable unblended polymer powder tailored to have the aforespecified two-tier distribution of primary particles which have a sphericity in the range from greater than 0.5 to 0.9, a bulk density of 500 to 700 g/L, and crystallinity in the range from 15 to 90%; has a "flow time" as given, at near $T_s$ but 2° C. to 25° C. below the powder's caking temperature $T_c$; and a specified melt viscosity (shear viscosity) >10 Pa-sec, typically in the range from 10 pa-sec to 1000 Pa-sec, when the temperature of the powder being sintered exceeds $T_c$ in less time than is required to melt contiguous large particles >53 µm; provided further that the pressure drop through a quiescent part bed 38 cm deep with a gas flow of 3–10 L/min through the bed is less than 10 kPa. The amount of gas flowed is not narrowly critical provided it is insufficient to cause channeling in the bed, or otherwise disrupt the bed, and sufficient to maintain the desired temperature profile in the bed.

According to another aspect of the invention, it has been found that the two-tiered particle size distribution is not required for the creation of a near-fully dense part, with minimal dimensional distortion, for materials and conditions where the recrystallization rate is sufficiently low. In this regard, it has been discovered that the rate of crystallization of the semi-crystalline organic polymer is a key property in controlling curl and achieving dimensional control in the sintered part. Materials that recrystallize relatively slowly after melting exhibit sufficient dimensional stability and create near-fully dense, distortion-free parts in the selective laser sintering process. Specifically, polymers that show little or no overlap between the melting and recrystallization peaks when scanned in a DSC at typical rates of 10°–20 C./minute work best in the selective laser sintering process.

It is therefore another object of this invention to provide a laser-sinterable polymer powder that resolidifies sufficiently slowly to eliminate in-build curl and in-plane distortion in parts produced by the selective laser sintering process.

BRIEF DESCRIPTION OF THE DRAWINGS

The foregoing and additional objects and advantages of the invention will best be understood by reference to the following detailed description, accompanied with schematic illustrations of preferred embodiments of the invention, in which illustrations like reference numerals refer to like elements, and in which:

FIG. 1 is a schematic illustration of a bed of uniform spheres packed in a bed.

FIG. 2 is a schematic illustration of a bed of large spheres and very small ("too-small") spheres, showing that the too-small particles fit within the interstitial spaces between larger particles, and produce a bed of higher hulk density and correspondingly higher pressure drop.

FIG. 3 is a graphical presentation of the number distribution of a particular tailored powder, namely Nylon 11.

FIG. 10 shows heating and cooling DSC scans for SC 912 powder, taken at 10° C./minute, showing an alternate method of characterizing the little overlap between the melting and recrystallization peaks.

FIG. 14 shows heating and cooling DSC scans for Surlyn 8660 powder, taken at 10° C./minute, showing the overlap between the melting and recrystallization peaks.

DETAILED DESCRIPTION OF THE PREFERRED EMBODIMENTS

Figure 4:
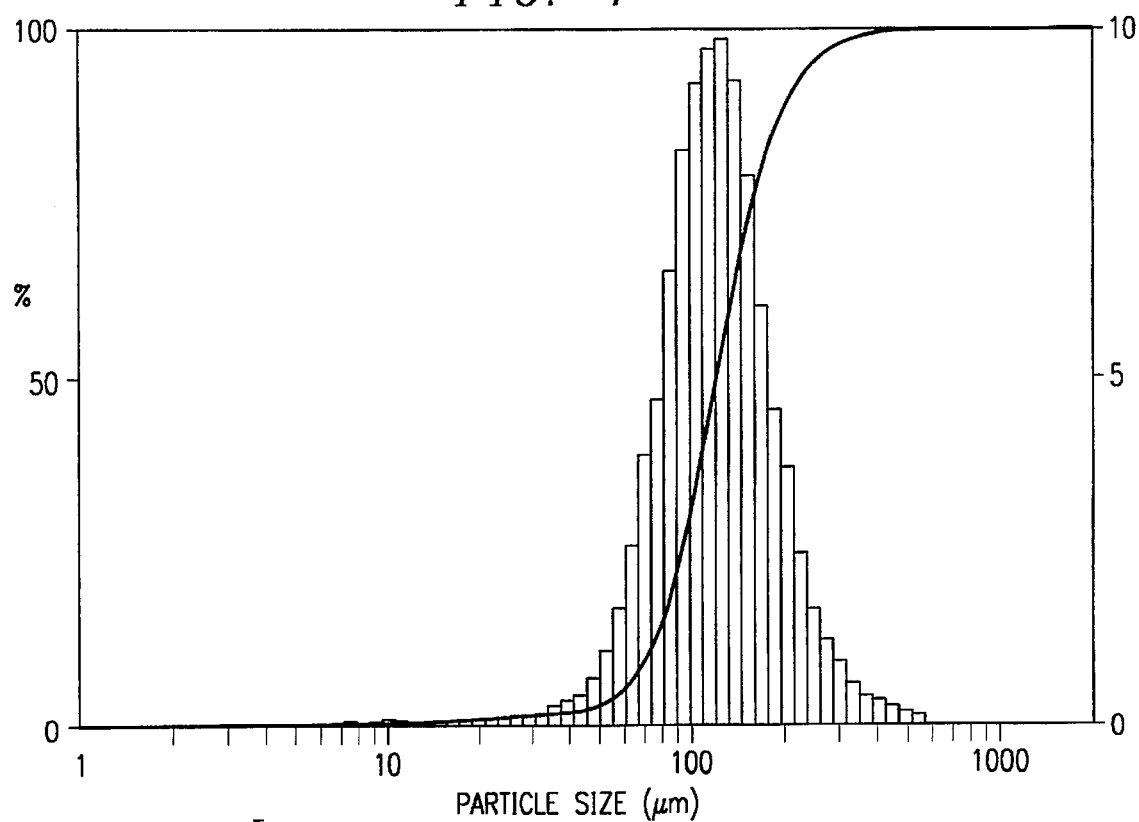
FIG. 4 a graphical presentation of the volume distribution of the same powder for which the number distribution is illustrated in FIG. 3.

The selective laser sintering machine specifically referred to herein uses a 10.6 µm $CO_2$ laser, but any other infra-red laser-generating source may be used, as well as excimer lasers and neodymium glass lasers which generate in the near-infra-red. A preferred laser is a Synrad Model C48-115 $CO_2$ laser. Powders are sintered using a 10.6 µm laser in the range from 3 to 30 watts operated at a ratio of power/scan speed in the range from 0.075 watts/cm/sec to 0.3 watts/cm/sec, preferably in the range from 0.1–0.2 watts/cm/sec using a beam width in the range from 0.23–0.9 mm, preferably from 0.4–0.6 mm. Particularly with Nylons 6, 11 and 12, PBT and PA, the selective laser sintering machine is preferably operated at a fluence in the range from 1 $mJ/mm^2$ to 100 $mJ/mm^2$, more preferably from 15 $mJ/mm^2$ to 45 $mJ/mm^2$, where fluence (milliJoules/$mm^2$) is the measure of the energy of the laser beam delivered to a defined area of powder. The laser is typically operated with a beam width of 0.6 mm and a power ranging from 3–22 watts, preferably from 5–10 watts, at a scanning speed ranging from about 76.2 cm/sec to 178 cm/sec.

Among the requirements of a preferred semi-crystalline or substantially crystalline powder uniquely tailored to yield, when sintered, a porous but near-fully dense article, are the following:

Free-Flowing or Non-Caking

The powder is freely flowable and does not cake when stored for up to 24 hr, at a temperature in the range from 2° C. to 20° C. below its caking temperature; in particular, the powder does not cake even when held from 1–8 hr in the part bed at $T_s$. at a slightly higher temperature than its storage temperature in the feed bed which latter is lower than $T_s$ of the powder. A determination as to whether a powder will meet the free-flowability requirement is made by running the time-temperature ASTM flow test referred to hereinabove.

Maximum Particle Size and Sphericity

The powder has sphericity >0.5 and contains essentially no particles having a nominal diameter exceeding 180 µm.

Referring to FIG. 3 there is presented in graphical form the number average particle distribution of Nylon 11. This powder was produced from Nylon 11 (lot #R256-A02) having a number average molecular weight in the range from 75,000 to 80,000 and a molecular weight distribution in the range from 1.2–1.7.

The Nylon 11 was ground in a manner which produces a mixture of relatively coarse particles having a sphericity greater than 0.5 and a wide distribution of smaller particles. The mixture was then sieved to eliminate substantially all particles larger than 180 µm, and the remaining particles were classified so as to conform to the number distribution shown in FIG. 3. The size distribution of the particles is obtained with a Malvern instrument which measures the size of the particles with a laser beam.

Flowability in the Selective-Laser-Sintering-Window

The melt viscous flow of polymer powder on the surface of a slice heated by the laser is determined by maintaining a temperature balance. For good interdiffusion of the polymer chains (sufficient to provide particle-to-particle adhesion, and layer-to-layer adhesion), a low melt viscosity is desirable. However, part definition is lost if significant melting occurs because the melt cannot be tightly confined near boundaries of the part being formed. Sintering is effected without means to assure isolation of the desired part features.

The selective-laser-sintering-window is of importance at this step (and step 1) because the temperatures of both beds, the feed bed and the part bed are elevated. Since the temperature of the part bed is elevated to the softening point of the powder to minimize curling, the wider the selective-laser-sintering-window, the greater the processing latitude provided by the powder. Maintaining the balance of properties in a tailored powder permits the requisite particle-to-particle fusion within a layer, and also layer-to-layer fusion, both of which are necessary to make a porous but near-fully dense part.

Referring to FIG. 4 there is shown a volume distribution curve of the same particles for which the number distribution is illustrated in FIG. 3, to show why the powder is freely flowable and how much of the volume in a bed of particles is occupied by "large particles". It appears that the few large particles are mainly responsible for rolling out the small particles with them, and also for permitting the essentially unobstructed passage of inert gas downwardly through the bed.

Growth

Since the finished (sintered) three-dimensional (3-D) part (s) are formed in the part bed in which the unsintered powder provides mechanical support for the sintered part, the part is subject to the thermal changes in the part bed due to the presence of the sintered part. Sequential, sudden heating of successive slices of powder in a thermally insulated environment causes the bed temperature to rise. The insulating environment is due to the sintered part being surrounded by a mass of porous powder which is a good insulator. When the temperature around the sintered part is either not low enough, or too high, the sintered part will distort due to thermal stresses in the bed. In addition, if the surfaces of the hot sintered part are too hot, there are agglomerations of fused particles adhering to and scattered as "growth" over the surfaces of the finished part, which growth must be removed and this can usually only be done by machining the growth away. When some "growth" does occur with the use of a tailored powder, the growth is so slight that it can be removed without damage to the surfaces of the part so that the surfaces are smooth to the touch. If there is substantial growth, the part made is scrapped.

The benefit of large particles in the two-tier distribution, according to this aspect of the invention, will be understood when it is realized that too-small particles, if not rollingly deposited on the part bed, would get packed and obstruct flow of the inert gas. The effect of being rollingly deposited layer upon layer, referred to as "layer-wise", onto the surface of the bed results in a "fluffy" bed which is dynamically stable but quiescent and relatively porous. The bed densities of a powder when not rollingly deposited are typically at least 20% higher than that of a bed of rollingly deposited powder.

A bed of such particles, when packed, are more quickly heated and over-heated (because of their small mass). The over-heated particles are then easily fused to the surface of the sintered part as "growth". The importance of controlling the top-to-bottom temperature profile within the part bed will be better understood by reference to FIG. 5.

The preferred crystallinity of a tailored powder which produces a near-fully dense sintered part with minimal growth is that which is correlatable to an observed heat of melting by DSC in the range from 20–120 cals/gm preferably from 30–60 cals/gm.

Figure 5:
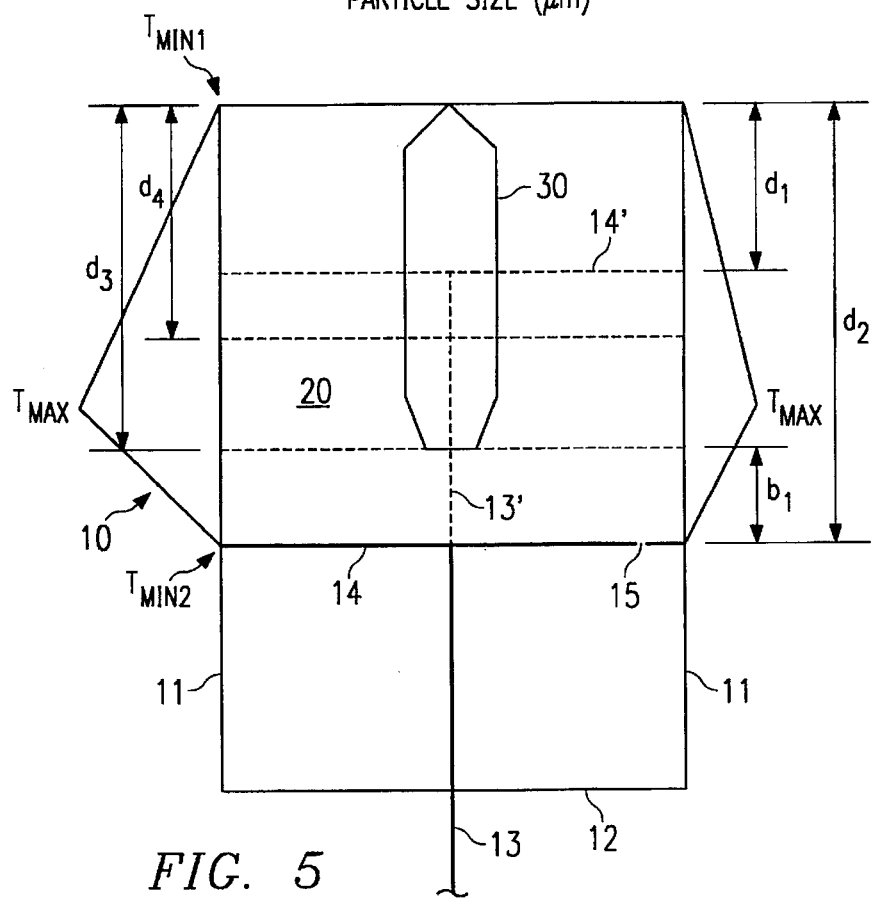
FIG. 5 is a schematic illustration of an elevational cross-sectional view of a cylindrical part bed of a selective laser sintering machine showing the position of the bed-supporting cylinder near the top of the cylinder at the beginning of the sintering procedure, and after the sintered part is formed; along with indications of the temperature profile within the bed for the tailored powder of this invention used with a conventional selective laser sintering procedure (on the left) without exteriorly controlling the temperature profile; and for the tailored powder with exterior temperature control of the bad temperature profile (right hand side).

Referring to FIG. 5 there is shown schematically, in cross-sectional view, a cylindrical part bed referred to generally by reference numeral 10, having sidewalls 11 and a bottom 12 through the center of which is slidably inserted a piston rod 13 having a piston 14 with a flat horizontal surface which supports a bed of thermooxidatively degradable powder 20. A through-passage having a relatively large diameter in the range from about 2.5 cm to 3.5 cm has a porous sintered metal disc 15 press-fitted into it to provide essentially free-flow of an inert gas, preferably nitrogen or argon, through it. A typical part bed has a diameter of 30.5 cm, and the travel of the piston from the bottom 12 to the top of the walls 11 is 38.1 cm.

A cylindrical part 30 with tapered ends, the bottom being truncated, is formed by sintering layer upon layer of preheated tailored powder, starting with the piston in the position indicated by its phantom outline at 14', supporting a bed of preheated powder about 10 cm deep, indicated by the depth $d_1$. The powder and walls of the cylinder are heated by infrared heating means to keep the temperature of the bed about 10° C. below the sticky temperature of the powder. However, it is difficult to heat the piston within the cylinder so that the piston is typically at a slightly lower temperature than the powder. Further, the mass of the piston 14' provides a heat sink to which the bottom layer of powder dissipates heat faster than any other layer. The upper surface of the bed is in the same plane as the top of the cylinder over which the roller (not shown) of the selective laser sintering machine distributes powder from the feed bed (also not shown).

As layer upon layer of powder is sintered, forming sequential horizontal slices of the sintered part 30, the piston 14' moves downwards until finally the part is completely sintered. The sintered part 30 is thus supported on the bed of powder on the bottom, and the depth of this lower portion of the bed is indicated as being $b_1$. This bed is the same initially presented as the target, and its depth $b_1$ remains numerically equal to the depth $d_1$ when the piston 14 has moved down to a depth indicated by $d_2$. The sintered part 30 rests on the bed of powder $b_1$ thick, the bottom of the sintered part being at a depth $d_3$.

Referring now to the result of a conventional selective laser sintering procedure, there is formed a hot sintered part 30 dissipating heat to the powder 20 surrounding it in unsteady state heat transfer. The lower portion $b_1$ forms a relatively cool zone of powder which dissipates heat to the piston 14, and through which powder heat from the part 30 is relatively well dissipated by convection currents through the bed $b_1$.

As soon as sintering is completed, the upper portion of the bed having depth $d_4$, particularly near the surface, begins to dissipate heat from part 30 lying within upper portion $d_4$. Heat dissipated by the part 30 is transferred relatively well mainly by convection currents through the upper portion $d_4$ of the powder bed 20, and less effectively through lower portion $b_1$.

The portion of the sintered part 30 lying in the intermediate portion of the bed 20, that is, the portion between the bed depths $d_1$ and $b_1$, is relatively well insulated by the surrounding powder. Heat from the part 30 causes the temperature to rise so that a maximum temperature $T_{max}$ is reached. The temperature at the surface of the relatively quickly cooling upper portion of the bed, is indicated by $T_{min1}$ and the temperature of the relatively quickly cooling lower portion of the bed $b_1$ is indicated by $T_{min2}$. It is thus seen that a temperature profile is established in the bed, the maximum temperature being substantially above the lowest temperatures in the profile, and located in a horizontal zone intermediate the upper and lower surfaces of the bed.

In the conventional selective laser sintering procedure, using the novel tailored powder, there is no forced cooling of the heated bed with gas so that a typical gradient between $T_{min1}$ and $T_{max}$, and between $T_{max}$ and $T_{min2}$ is more than 2° C./cm in each case (on either side of $T_{max}$). For example, if $T_{min1}$ at the upper surface after sintering is 175° C., $T_{max}$ is 182° C. and $T_{min2}$ is about 171° C. Because $T_{max}$ is very close to the melting point 183° C. of the powder, the sintered part is exposed to a high likelihood of being distorted. It will be evident that a large part of this powder could not be sintered successfully in a conventional selective laser sintering bed because $T_{max}$ will exceed $T_c$ and the part will distort.

In FIG. 5, on the left hand side thereof, the straight lines drawn connecting the temperatures at the surface and bottom of the bed, are drawn on the assumption that the gradient is a straight line, which it most probably is not, but the linear representation serves as an approximation to focus the fact that the gradient is steeper for the conventional selective laser sintering procedure than it is for the novel procedure in which an inert cooling gas is flowed through the bed while the part is being sintered.

In the procedure with forced cooling, using the novel tailored powder, the porosity of the bed permits forced cooling of the heated bed with inert gas, so that a typical gradient between $T_{min1}$ and $T_{max}$, and between $T_{max}$ and $T_{min2}$ is less than 2° C./cm in each case. For example, if $T_{min1}$ at the upper surface after sintering is 175° C., $T_{max}$ is 177° C. and $T_{min2}$ is about 173° C. Because $T_{max}$ is not close to the melting point 183° C. of the powder, the sintered part is not likely to be distorted.

The temperature profile for the process conditions using the inert cooling gas are shown on the right hand side of FIG. 5, where it is seen that the gradient to $T_{max}$ is less, and $T_{max}$ itself is lower than it was in the conventional selective laser sintering process. Thus, the risk of part distortion and growth (on the surface) is minimized as is the thermal degradation to the powder surrounding the sintered part. Such thermal degradation occurs when the powder is overheated, that is, too far past its softening point, even if it is not heated past its $G'_c$ temperature.

Figure 6:
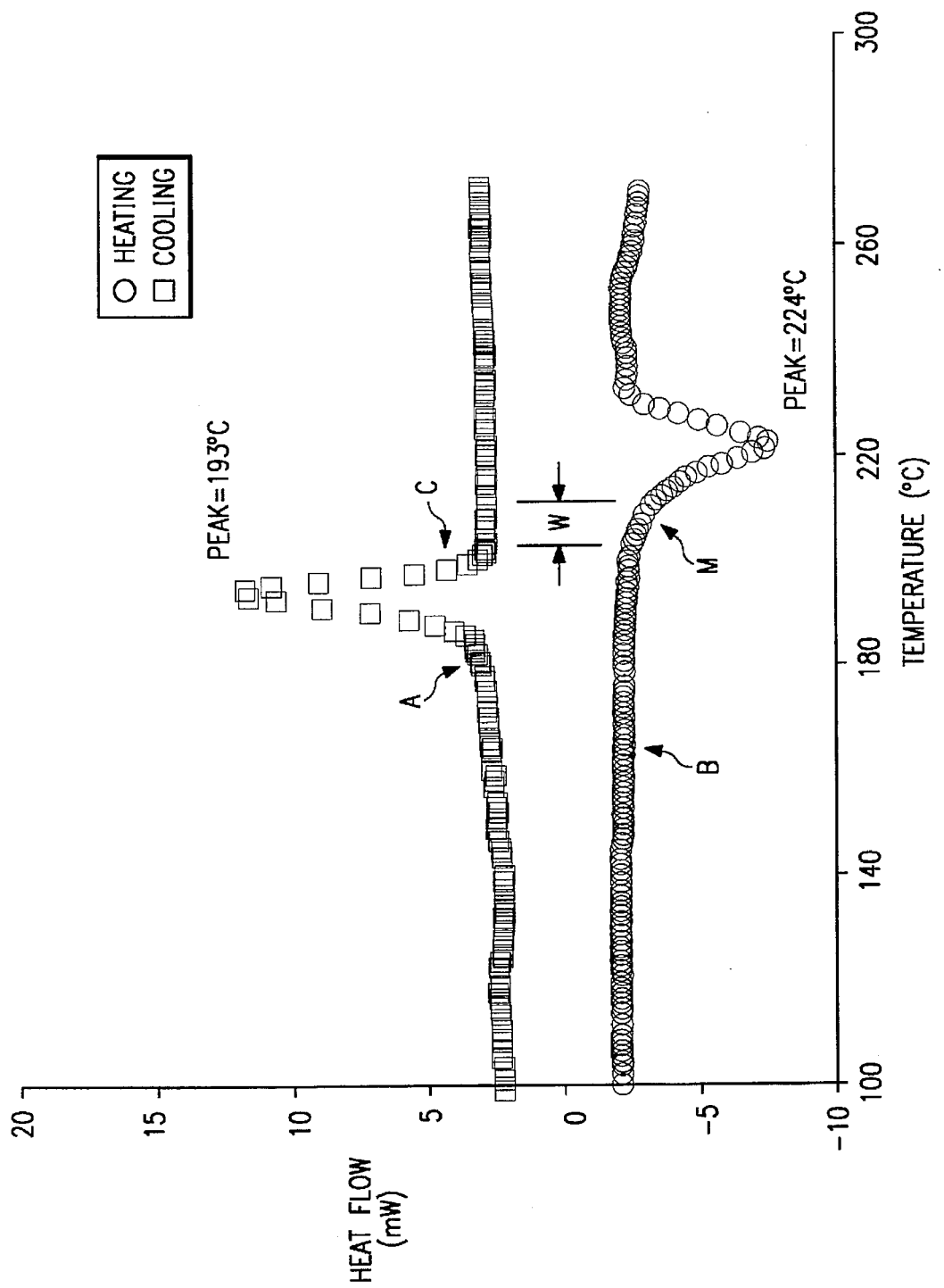
FIG. 6 shows DSC scans for the heating and cooling curves of a laser-sinterable PBT powder.

To put the foregoing details in perspective, one may evoke a physical picture of the selective-laser-sintering-window by reference to FIG. 6 in which curve A (plotted with squares to track heat flow) represents the cooling curve for a sample of tailored PBT powder. The peak occurs at 193° C., but supercooling commences near the temperature 202° C., a point indicated by the arrow C ($T_s$). Curve B (plotted with circles) represents the heating curve for the same sample. The peak occurs at 224° C., but onset of melting commences near the temperature 212° C., a point indicated by the arrow M ($T_c$). Thus, the window W is provided by the difference in the temperatures at M and C, which for this sample of PBT is 10° C.

The following results were obtained when Nylon 11 having a molecular weight Mn of about 80,000; Mw/Mn= 1.6, and $G'_c = 2 \times 10^6$ dynes/cm² at 175° C. was sintered into test bars with a beam width of 0.6 mm, the laser power set at 8 watts and a scan speed of 175 era/sec. The values for four sets of bars were averaged in Table 1 hereinbelow.

Other preferred semi-crystalline polymers which are successfully tailored for use in the selective laser sintering machine are polybutylene terephthalate (PBT); polypropylene (PP); and polyacetal (PA). The preferred mean primary particle diameter for each of the tailored powders is in the range from 80 μm–100 μm. The values for these powders are given in the following Table 2.

TABLE 2

| Powder | $T_s$, °C. | $T_c$, °C. | selective-laser-sintering-window, °C. |
|---|---|---|---|
| Nylon 11 | 153 | 170 | 17 |
| PBT | 195 | 210 | 15 |
| PA | 150 | 157 | 7 |

Each of the foregoing tailored powders was used to make sintered bars 10 cm long, 2.5 cm wide and 3 cm thick. A statistically significant number of bars were made from each powder and tested to compare the sintered bars with bars of identical dimensions but compression molded. The results with PBT are set forth in the following Table 3:

TABLE 3

| Comparison of Physical Properties of Sintered and Compression Molded Test Bars of PBT | | |
|---|---|---|
| | Sintered | Injection Molded* |
| Density, g/cm³ | 1.19 | 1.31 |
| Flexural Modulus, psi | $2.99 \times 10^5$ | $3.80 \times 10^5$ |
| Max. Stress at yield, psi | $8.3 \times 10^3$ | $14.7 \times 10^3$** |
| Notched Izod, ft-lb/in | 0.29 | 0.70 |
| HDT, °C. | 206 | 163** |

*supplier's data - no compression molded data available.
**value of max stress yield for injection molded sample would be higher because of chain orientation; value of HDT is different because the sample preparation and thermal history is different from applicant's sample.

The conditions for sintering test bars from several different semicrystalline materials, each of which having a different window of sinterability is provided in the following Table 4 hereinbelow. In each case, the selective laser sintering machine was operated with a laser having a beam width of 0.6 cm, at its maximum power (22 watts) and a scan speed of from 127–178 cm/sec (50–70 in/sec), maximum power being used so as to finish sintering test bars in the least possible time. In each case the bars were sintered in a part bed having a diameter of 30 cm which can hold powder to a depth of 37.5 cm. In each case, the powder was maintained in the feed bed at below $T_s$ and the powder was transferred by a roller to the part bed, the surface of which was near $T_s$. In each case, the bed was heated by an external electric heater to bring it up to temperature. In each case, note that the density of the sintered part is about 90% of the density of a molded, fully dense, part. Even better physical properties are obtained when the parts are sintered at lower power and slower scan speed (lower fluence).

According to another aspect of the present invention, it has now been discovered that the rate of crystallization of the semi-crystalline organic polymer is a key property in controlling curl and achieving "in-plane" (x-y) dimensional control. In the selective laser sintering process, the part bed temperature can usually be maintained just below the onset of melting the semi-crystalline powder. At the melting point, the material is transformed from a solid to a viscous liquid over a narrow temperature range. Only a small quantity of energy (the heat of fusion) is required to transform the material to a state where densification can occur. Not all semi-crystalline polymers work well in the selective laser sintering process, however. Materials that resolidify or recrystallize quickly after melting tend to exhibit in-build curl, just like amorphous materials. Wax is an example of a material that recrystallizes so quickly that it develops in-build curl. To build flat wax parts in the selective laser sintering process, support structures which anchor the parts to the piston bed are required.

Some materials, however, resolidify slowly enough at the part bed temperature (i.e., the driving force for crystallization is small enough near the melting point) that the parts remain in the supercooled liquid state for a significant amount of time during the part building process. Since liquids do not support stresses, no in-build curl is observed as long as the part is not cooled sufficiently to induce more rapid recrystallization. Nylon 11 is an example of a material that recrystallizes sufficiently slowly in the selective laser sintering process to eliminate in-build curl. During the building of Nylon 11 parts in the selective laser sintering process, the parts remain transparent to depths of greater than one inch. This transparency indicates that little or no resolidification or recrystallization of the part has occurred, since resolidified, semi-crystalline parts are opaque.

The rate of crystallization can also be characterized by DSC. While actual rates of crystallization are often difficult to quantify from these experiments, the difference in temperature between the onset of melting and onset of recrystallization is directly related to the rate of crystallization— the larger this temperature difference, the slower the rate of crystallization. As discussed hereinabove with respect to the "window of sinterability," to create a DSC trace, a material is heated to above its melting point at a controlled rate and then cooled back down, also at a controlled rate. This observed temperature difference between melting and recrystallizing, however, can also be affected by the heating and cooling rates used to create the DSC data. Data must therefore be reported in terms of scanning rate. Specifically, polymers that show little or no overlap between the melting and recrystallization peaks when scanned in a DSC at typical rates of 10°–20° C./minute work best in the selective laser sintering process.

Figure 7A:
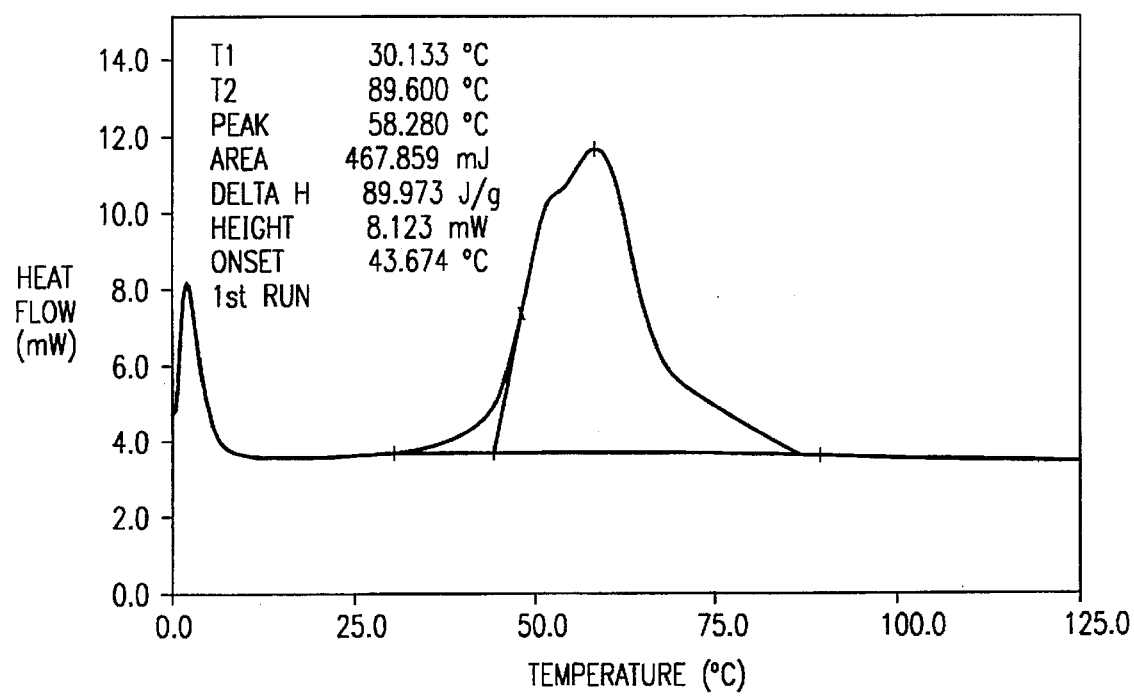
FIGS. 7A and 7B show heating and cooling DSC scans for wax, taken at 20° C./minute, showing the overlap between the melting and recrystallization peaks.
Figure 7B:
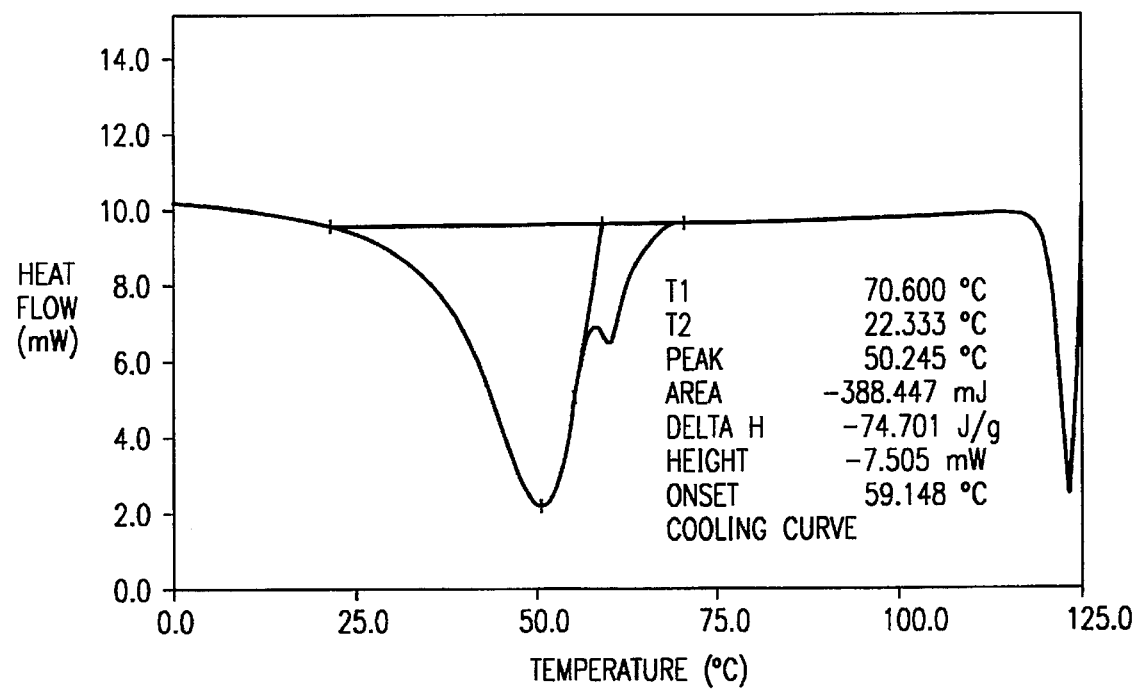

FIGS. 7A and 7B show heating and cooling curves, respectively, for wax, taken at a rate of 20° C./minute. FIG. 7A shows a heating curve for a sample of wax powder where, as the crystalline phase melts, an endothermic peak is observed. FIG. 7B shows a cooling curve for the same sample of wax where, when cooled, an exothermic peak is observed as the material recrystallizes. Note that the melting and recrystallization peaks shown in FIGS. 7A and 7B overlap significantly-from about 40° C. to about 60° C. FIGS. 7A and 7B thus indicate that wax recrystallizes relatively quickly when cooled to a temperature just below its melting point. This rapid recrystallization causes in-build curl in the selective laser sintering process, unless special precautions are taken.

Figure 8A:
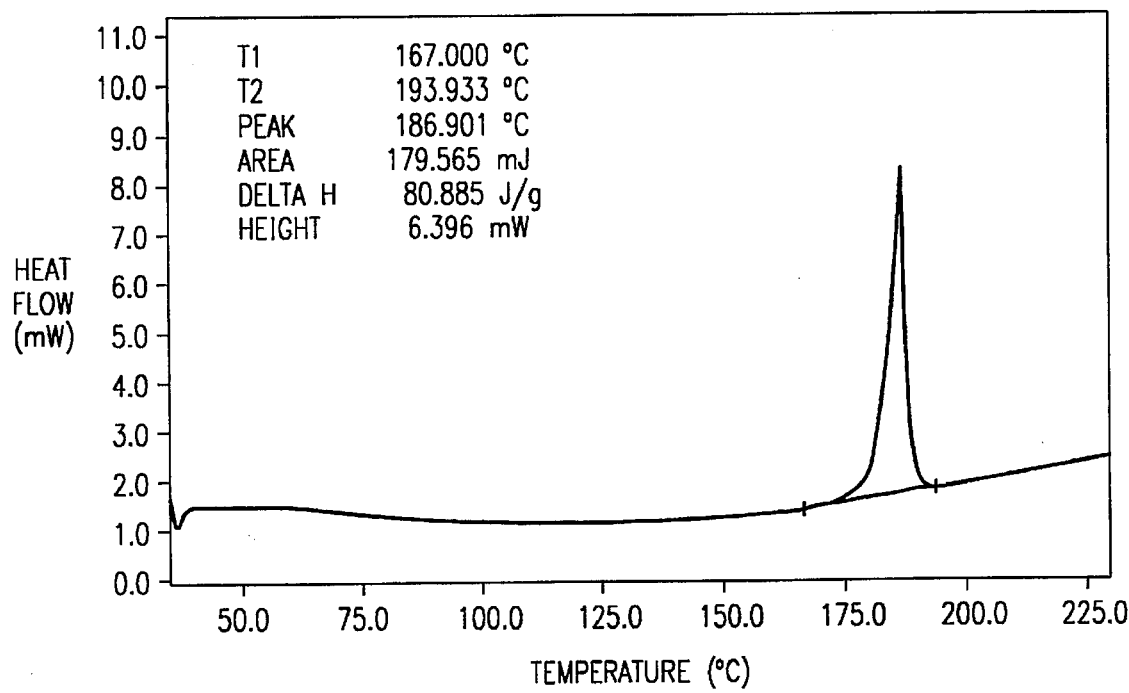
FIGS. 8A and 8B show heating and cooling DSC scans for Nylon 11, taken at 10° C./minute, showing the lack of overlap between the melting and recrystallization peaks.
Figure 8B:
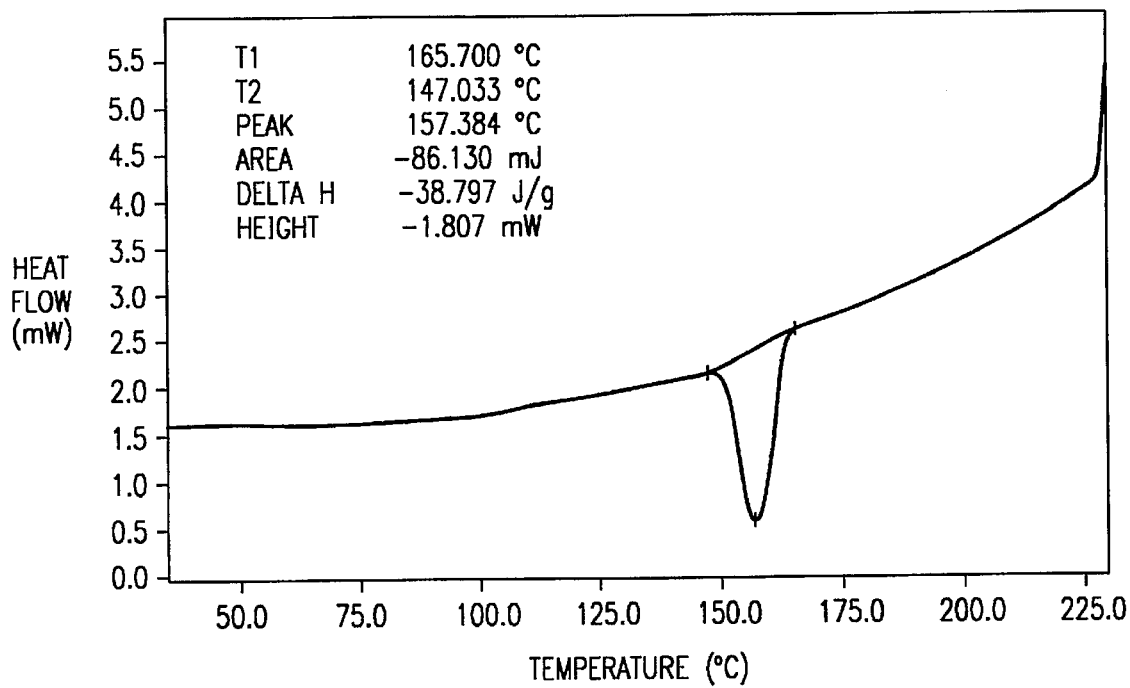

FIGS. 8A and 8B show heating and cooling curves, respectively, for Nylon 11, taken at a rate of 10° C./minute. FIG. 8A shows a heating curve for a sample of Nylon 11 powder. FIG. 8B shows a cooling curve for the same sample of Nylon 11 powder. Note that the melting and recrystallization peaks shown in FIGS. 8A and 8B do not overlap at all. FIGS. 8A and 8B indicate that Nylon 11 recrystallizes upon cooling at a temperature significantly lower than its melting point. Thus, Nylon 11 remains in the liquid state relatively longer than wax at temperatures below the melting point of the respective materials. Because liquids do not support stresses, Nylon 11 therefore does not exhibit in-build curl in the selective laser sintering process.

Figure 9A:
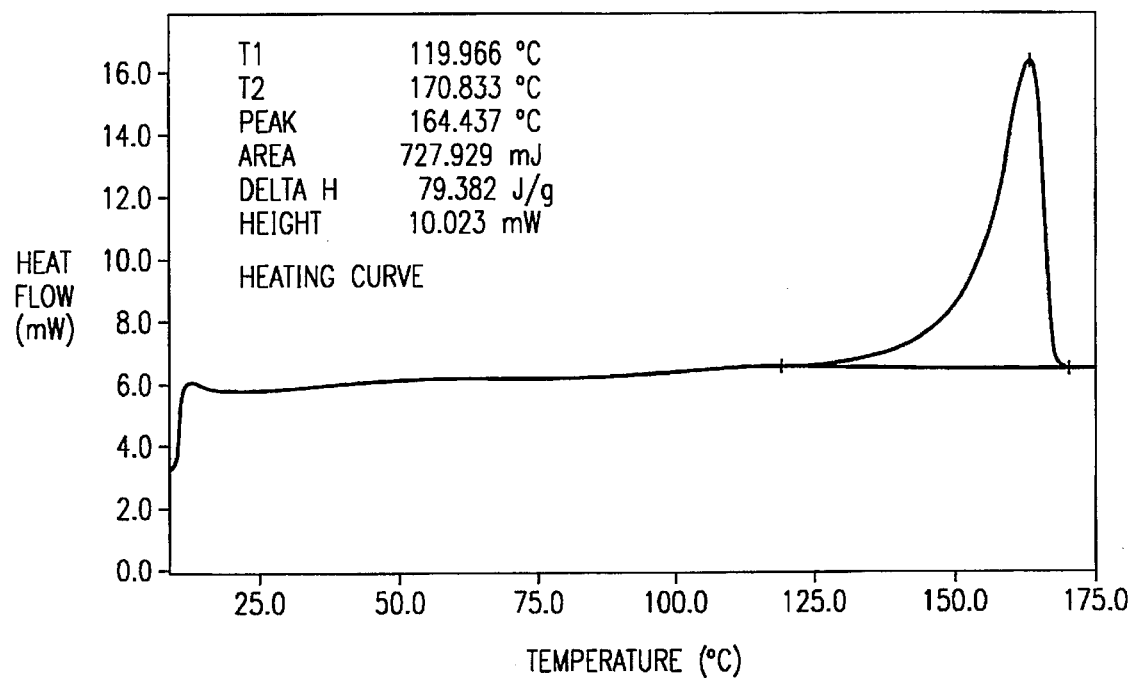
FIGS. 9A 9B eating and cooling DSC scans for SC 912 powder, taken at 10° C./minute, showing little overlap between the melting and recrystallization peaks.
Figure 9B:
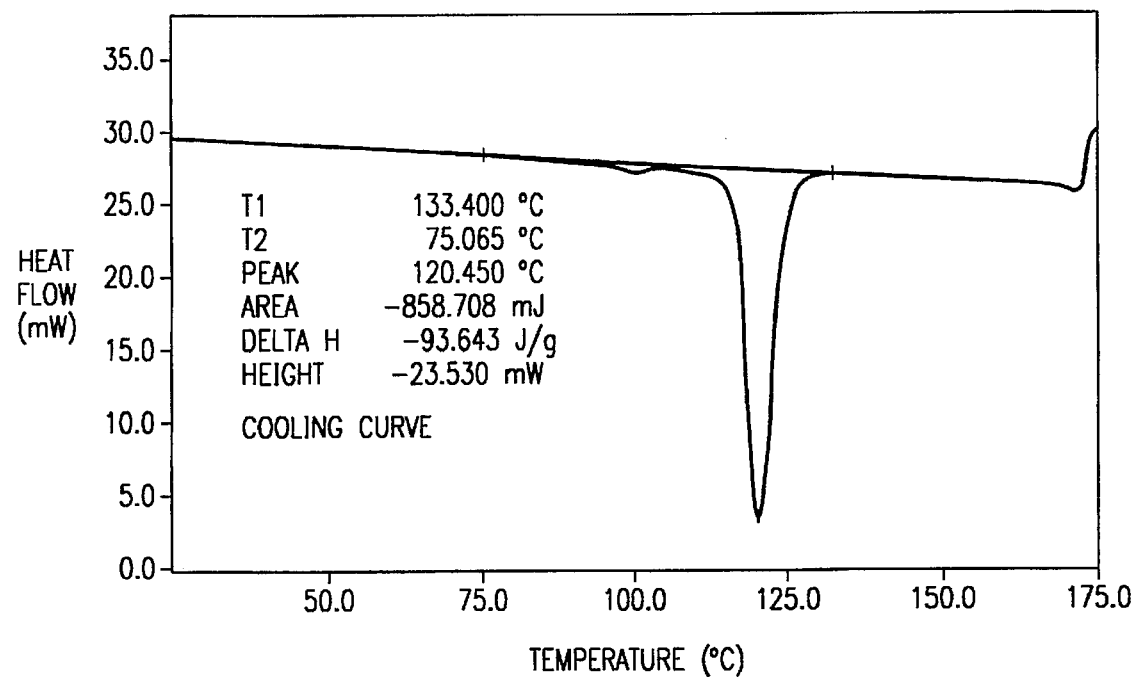

FIGS. 9A and 9B show heating and cooling curves, respectively, for SC 912, a polypropylene copolymer powder sold by Montel. FIG. 9A shows a heating curve for a sample of SC 912 powder as shown by DSC measured at a scanning rate of 10° C./minute. FIG. 9B shows a cooling curve for a sample of SC 912 powder as shown by DSC measured at a scanning rate of 10° C./minute. The melting and recrystallization peaks shown in FIG. 9A and 9B exhibit an overlap of approximately 13° C., from about 120° C. to about 133° C. Such little degree of overlap indicates that SC 912 powder recrystallizes sufficiently slowly in a selective laser sintering process to eliminate in-build curl.

Alternatively, this sufficiently slow recrystallization rate of SC 912 powder can be expressed as a percentage ratio of the area under the melting peak below the temperature at which SC 912 begins to recrystallize during cooling to the total area under the melting peak. FIG. 10 shows a heating curve and a cooling curve for a sample of SC 912 powder as shown by DSC measured at a scanning rate of 10° C./minute. One should note that in FIG. 10, the endothermic melting peak points downward and the exothermic cooling peak points upward, as the display convention of the DSC apparatus used to generate FIG. 10 was directly opposite from the convention of the DSC apparatus used to generate FIGS. 9A and 9B. As shown by the cooling curve of FIG. 10, the sample of SC 912 begins to recrystallize at approximately 143° C. The total area under the melting peak is measured as approximately 74.0 Joules/gram. The area under the melting peak below this onset of recrystallization temperature, which is shaded and labeled with the letter A in FIG. 10, is measured as approximately 4.6 Joules/gram. Therefore, approximately 6.2% of the total area under the melting peak is below the onset of recrystallization temperature. Such little degree of overlap between the melting peak and the recrystallization peak indicates that SC 912 recrystallizes sufficiently slowly in a selective laser sintering process to eliminate in-build curl.

Figure 11A:
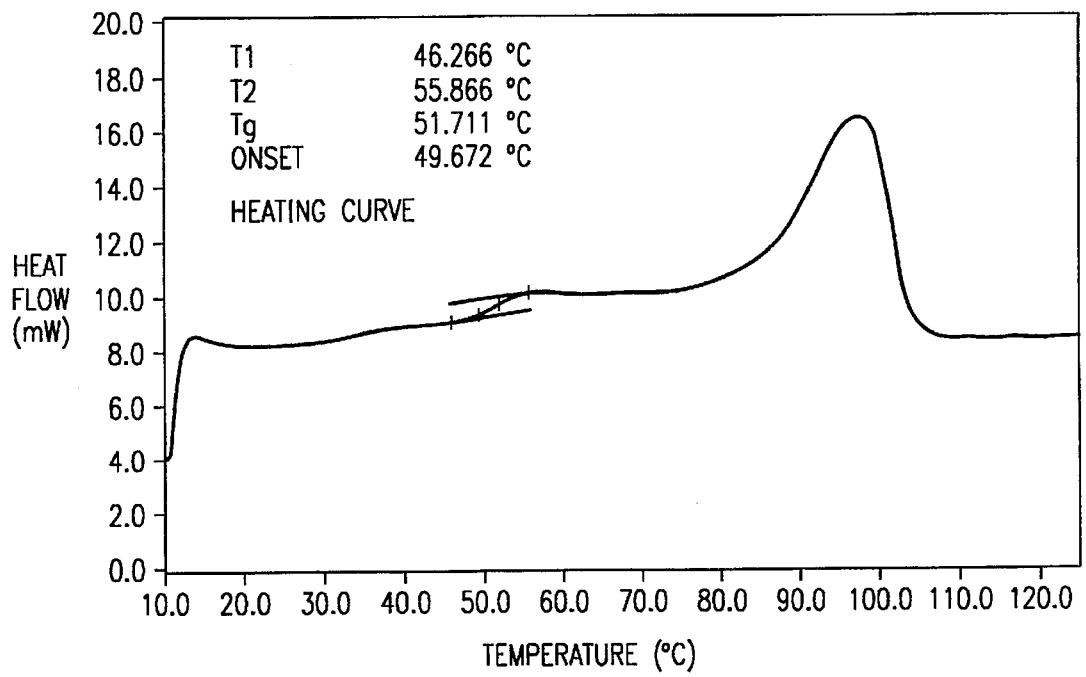
FIGS. 11A and 11B show heating and cooling DSC scans for Affinity SM-1300 powder, taken at 10° C./minute, showing little overlap between the melting and recrystallization peaks.
Figure 11B:
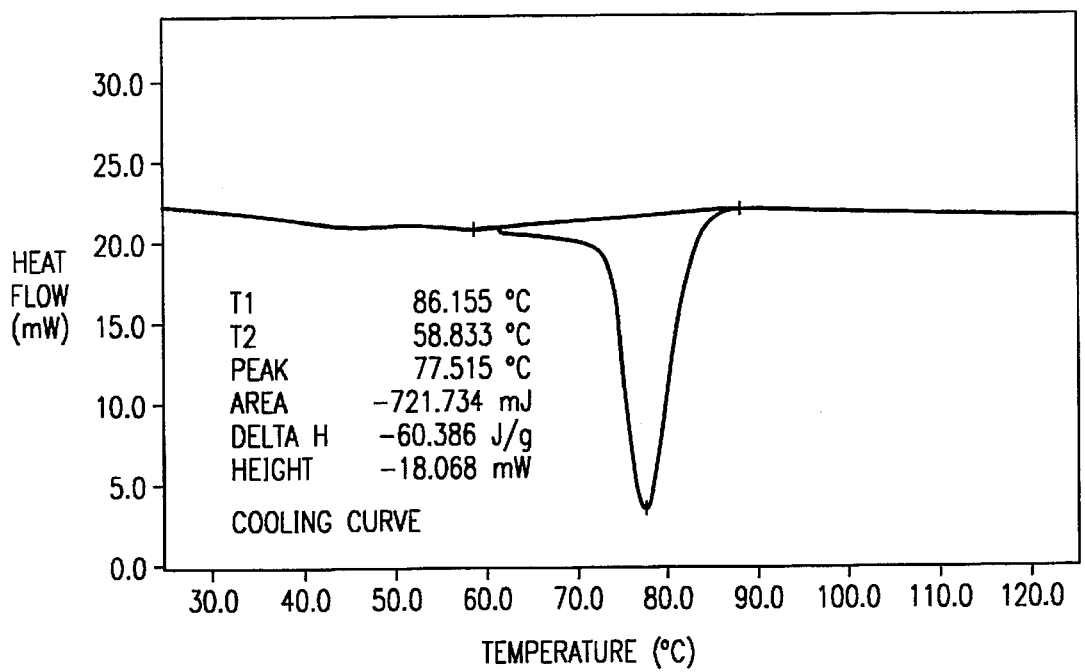

FIGS. 11A and 11B show heating and cooling curves, respectively, for Affinity SM-1300 (hereinafter "SM-1300"), a single site, branched polyethylene copolymer powder sold by Dow Chemical. It is believed that SM-1300 is a copolymer of ethylene and octene. FIG. 11A shows a heating curve for a sample of SM-1300 powder as shown by DSC measured at a scanning rate of 10° C./minute. The portion of the heating curve from about 45° C. to about 55° C. represents the glass transition temperature for the powder. FIG. 11B shows a cooling curve for a sample of SM-1300 powder as shown by DSC measured at a scanning rate of 10° C./minute. The melting and recrystallization peaks shown in FIGS. 11A and 11B exhibit an overlap of approximately 11° C., from about 75° C. to about 86° C. Such little degree of overlap indicates that SM-1300 recrystallizes sufficiently slowly in a selective laser sintering process to eliminate in-build curl.

Figure 12:
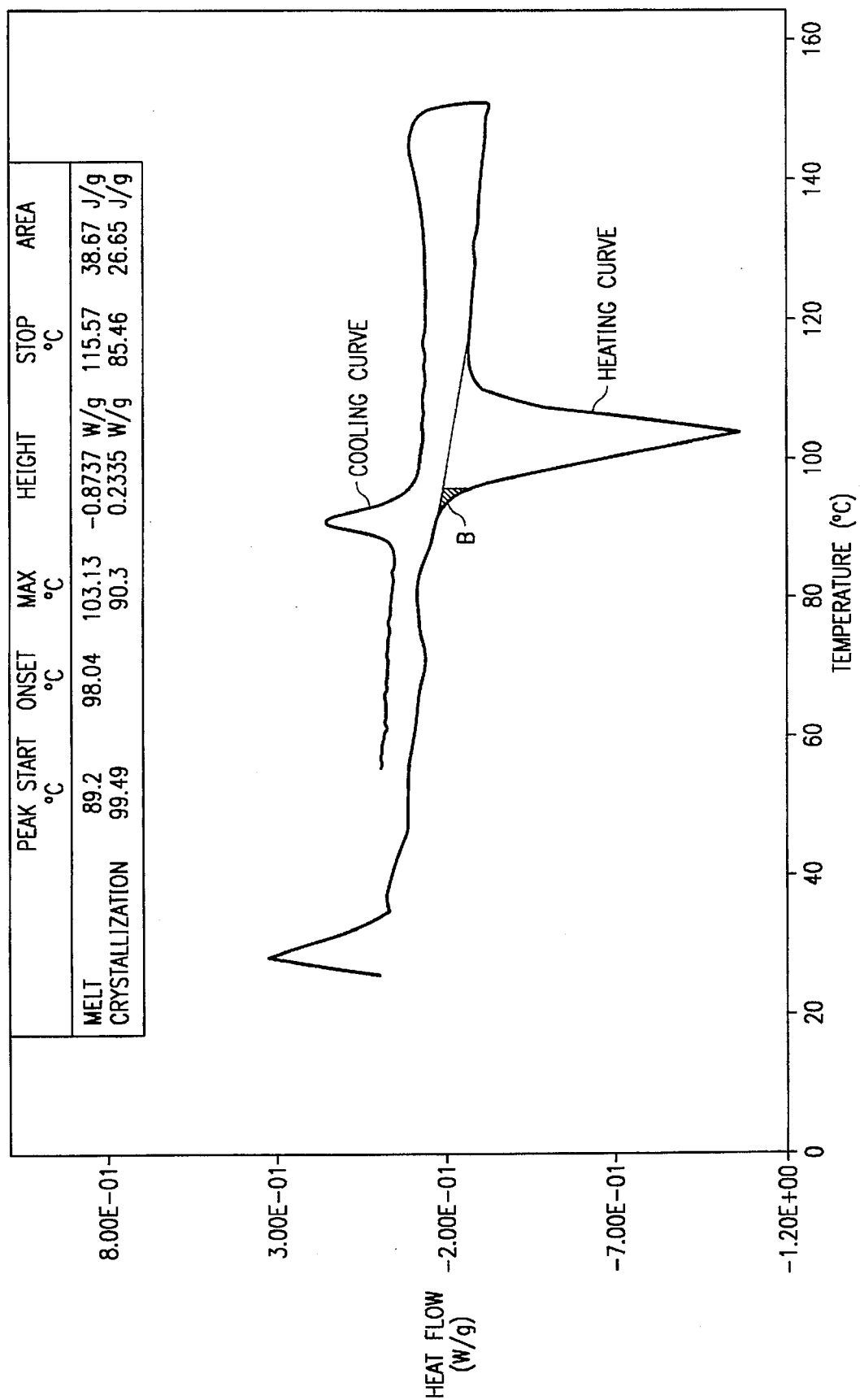
FIG. 12 shows heating and cooling DSC scans for Affinity SM-1300 powder, taken at 10° C./minute, showing an alternate method of characterizing the little overlap between the melting and recrystallization peaks.

Alternatively, this sufficiently slow recrystallization rate of SM-1300 powder can be expressed as a percentage ratio of the area under the melting peak below the temperature at which SM-1300 begins to recrystallize during cooling to the total area under the melting peak. FIG. 12 shows a heating curve and a cooling curve for a sample of SM-1300 powder as shown by DSC measured at a scanning rate of 10° C./minute. One should note that in FIG. 12, the endothermic melting peak points downward and the exothermic cooling peak points upward, as the display convention of the DSC apparatus used to generate FIG. 12 was directly opposite from the convention of the DSC apparatus used to generate FIGS. 11A and 11B. As shown by the cooling curve of FIG. 12, the sample of SM-1300 begins to recrystallize at approximately 99.5° C. The total area under the melting peak is measured as approximately 38.7 Joules/gram. The area under the melting peak below this onset of recrystallization temperature, which is shaded and labeled with the letter B in FIG. 12, is measured as approximately 1.06 Joules/gram. Therefore, approximately 2.7% of the total area under the melting peak is below the onset of recrystallization temperature. Such little degree of overlap between the melting peak and the recrystallization peak indicates that SM-1300 powder recrystallizes sufficiently slowly in a selective laser sintering process to eliminate in-build curl.

The preferred powders of Nylon 11, SC 912, and Affinity SM-1300 are exemplary and not limiting of this aspect of the present invention. In general, it is believed that certain nylons (other than Nylon 11), polyacetals, polypropylenes, polyethylenes, and ionomers exhibit similar melting and recrystallization behavior in DSC scans and in the selective laser sintering process, and are therefore also preferred materials according to this aspect of the invention. Other materials believed to exhibit similar melting and recrystallization behavior in DSC scans and in the selective laser sintering process, and which are therefore also preferred materials according to this aspect of the invention, include certain copolymers of nylons, acetals, ethylenes, and propylenes (other than SC 912); certain branched versions of polyethylene and polypropylene; and certain branched versions of polyethylene copolymers (other than SM-1300) and polypropylene copolymers. Copolymerization and branching are modifications to the molecular structure of polymers that can be used to control the degree of crystallinity as well as the rate of recrystallization. All of the above-described materials preferably exhibit an overlap between their melting and recrystallization peaks, as shown in DSC traces measured at a scanning rate of 10°–20° C./minute, ranging from 0° C. (no overlap) to no more than about 13° C. More preferably, all of the above-described materials exhibit such an overlap ranging from 0° C. (no overlap) to no more than about 11° C. In addition, all of the above-described materials preferably exhibit a percentage ratio of the area under the melting peak below the onset of recrystallization temperature to the total area under the melting peak, as shown in DSC traces measured at a scanning rate of 10°–20° C./minute, ranging from about 0% (no overlap) to no more than about 6.2%. More preferably, the above-described materials exhibit such a percentage ratio ranging from 0% (no overlap) to no more than about 2.7%.

Figure 13:
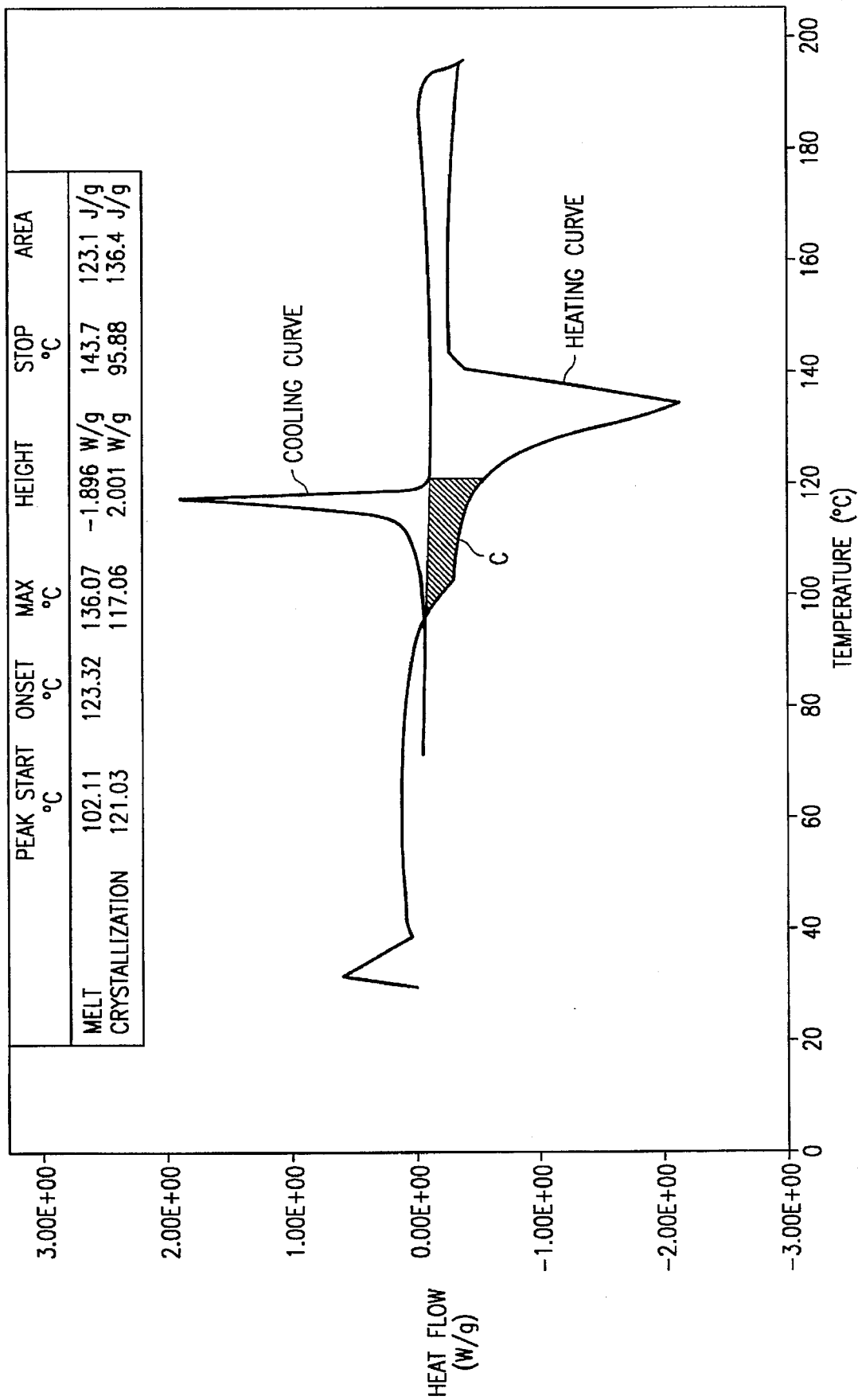
FIG. 13 shows heating and cooling DSC scans for IP60 powder, taken at 10° C./minute, showing the overlap between the melting and recrystallization peaks.

It has been found that IP60, a particular high density polyethylene powder sold by Dow Chemical, does not exhibit the above-described melting and recrystallization behavior in DSC scans, and therefore IP60 powder does not work well in the selective laser sintering process. More specifically, FIG. 13 shows a heating curve and a cooling curve for a sample of IP60 powder as shown by DSC measured at a scanning rate of 10° C./minute. As shown in FIG. 13, the IP60 powder exhibits an overlap between its melting and recrystallization peaks of approximately 24° C., from about 97° C. to about 121° C. In addition, the cooling curve of FIG. 13 shows that IP60 powder begins to recrystallize at approximately 121° C. The total area under the melting peak is measured as approximately 123.1 Joules/gram. The area under the melting peak below this onset of recrystallization temperature, which is shaded and labeled with the letter C in FIG. 13, is measured as approximately 26.2 Joules/gram. Therefore, approximately 21.3% of the total area under the melting peak of IP60 powder is below the onset of recrystallization temperature.

Similarly, it has also been found that Surlyn 8660, a particular ionomer powder sold by Dupont, does not exhibit the above-described melting and recrystallization behavior in DSC scans, and therefore Surlyn 8660 powder does not work well in the selective laser sintering process. More specifically, FIG. 14 shows a heating curve and a cooling curve for a sample of Surlyn 8660 powder as shown by DSC measured at a scanning rate of 10° C./minute. As shown in FIG. 14, the Surlyn 8660 powder exhibits an overlap between its melting and recrystallization peaks of approximately 40° C., from about 45° C. to about 85° C. In addition, the cooling curve of FIG. 14 shows that Surlyn 8660 powder begins to recrystallize at approximately 85° C. The total area under the melting peak is measured as approximately 28.8 Joules/gram. The area under the melting peak below this onset of recrystallization temperature, which is shaded and labeled with the letter D in FIG. 14, is measured as approximately 10.4 Joules/gram. Therefore, approximately 36.1% of the total area under the melting peak of Surlyn 8660 powder is below the onset of recrystallization temperature.

Accordingly, polymers that show little or no overlap between their melting and recrystallization peaks when scanned at typical DSC rates of 10°–20° C./minute work best in a selective laser sintering process. Such overlap can be expressed in terms of °C. or in terms of a percentage ratio of the area under the melting peak below the onset of recrystallization temperature to the total area under the melting peak. For example, wax, IP60 powder, and Surlyn 8660 powder are not suitable materials by this test, while Nylon 11 powder, SC 912 powder, and SM1300 powder are. Most suitable materials preferably have melting points below 200° C. As noted above, suitable materials according to this aspect of the invention include Nylon 11 powder; SC 912 powder; SM-1300 powder; certain nylons (other than Nylon 11), polyacetals, polypropylenes, polyethylenes, and ionomers; certain copolymers of nylons, acetals, ethylenes, and propylenes (other than SC 912); certain branched versions of polyethylene and polypropylene; and certain branched versions of polyethylene copolymers (other than SM-1300 ) and polypropylene copolymers.

Having thus provided a general discussion, described the requirements of a laser-sinterable powder in detail, and illustrated the invention with specific examples of the best mode of making and using the powder, it will be evident that the invention has provided an effective solution to a difficult problem. It is therefore to be understood that the claims are not to be limited to a slavish duplication of the invention and no undue restrictions are to be imposed by reason of the specific embodiments illustrated and discussed.

TABLE 1

| Property | Value | |
|---|---|---|
| | Last Sintered | Compression Molded |
| Thermal | | |
| Glass Transition (°C.) | | |
| Melt (onset, °C.) | | |
| Heat Distortion | | |
| @ 264 psi (°C.) | 46, 46 | 41, 41 |
| @ 66 psi (°C.) | 163, 167 | 163, 159 |
| TGA (onset of degradation) | not measured | |
| Mechanical | | |
| Tensile (5 mm/min crosshead) | | |
| Modulus (psi) [σ] | 201, 100, [10, 540] | 207, 700 [11, 630] |
| Elongation, ultimate (%) | 28.0 [5.3] | 201.6 [151] |
| Strength (psi) | 6323 [157] | 6315 [115] |
| Elongation, yield (%) | 26.0 [3.3] | 30.0 [1.3] |
| Energy to break (lb-in) | 205 [53] | 2, 149 [316] |
| Tensile (50 mm/min crosshead) | | |
| Modulus (psi) | 221, 500 [28, 610] | 227, 800 [18, 890] |
| Elongation, ultimate (%) | 27.0 [5.5] | 271.8 [146.3] |
| Strength (psi) | 6413 [130] | 6200 [517] |
| Elongation, yield (%) | 24.1 [32] | 21.9 [93] |
| Energy to break (lb-in) | 203 [43] | 1, 995 [566] |
| Flexural | | |
| Modulus (psi) | 146, 800 [4147] | 176, 900 [4368] |
| Strength (psi) | 7154 [159] | 7044 [271] |
| Elongation, yield (%) | .091 [.002] | .065 [.002] |
| Izod Impact (notched) | | |
| @ 23° C. (ft-lb/in) | 1.4 [.2] | 1.89 [.24] |
| @ −40° C. (ft-lb/in) | 1.03 [.2] | |
| Physical | | |
| Specific Gravity | 1.0204 [.004] | 1.0360 [.0004] |

TABLE 4

| Ex | Polymer | Feed Bed Temp. °C. | Part Bed Temp. °C. | Part Dens. gm/cm$^3$ | Full Dens. gm/cm$^3$ | Notch Impact | HDT °C. | MAX STRESS psi | FLEX MOD psi |
|---|---|---|---|---|---|---|---|---|---|
| 1 | Nylon 6 | 140 | 180 | 0.958 | 1.04 | 1.5 | 175 | 11510 | 272100 |
| 2 | Nylon 11 | 135 | 165 | 0.919 | 0.987 | 1.67 | 166 | 8310 | 159900 |
| 3 | Nylon 12 | 75 | 160 | 0.90 | 1.01 | 0.39 | 163 | 8120 | 150750 |
| 4 | P'Acetal | 130 | 150 | 1.283 | 1.41 | 0.72 | 149 | 9468 | 312400 |
| 5 | PBT | 160 | 195 | 1.19 | 1.31 | 0.29 | 206 | 8270 | 299700 |

*(ft-lb/in): Izod impact, notched - measured at 23° C.

We claim:

1. A method of producing a three-dimensional object, comprising the steps of:
   applying a layer of a powder at a target surface, said powder comprised of a semi-crystalline organic polymer, said powder having a melting peak and a recrystallization peak, as shown in differential scanning calorimetry traces, which show little overlap when measured at a scanning rate of 10°–20° C./minute, and wherein said polymer is selected from the group consisting of nylon, polyacetal, polypropylene, polyethylene, and ionomers;
   directing energy at selected locations of said layer corresponding to the cross-section of the object to be formed in said layer to sinter said powder thereat; and
   repeating said applying and directing steps to form the object in layerwise fashion.

2. The method of claim 1 further comprising the step of removing unsintered powder from said object.

3. The method of claim 1 wherein said overlap is no more than about 13° C.

4. The method of claim 1 wherein said overlap is no more than about 11° C.

5. The method of claim 1 wherein said overlap, expressed as a percentage ratio of an area tinder said melting peak below an onset of recrystallization temperature of said powder to a total area under said melting peak, is no more than about 6.2%.

6. The method of claim 1 wherein said overlap, expressed as a percentage ratio of an area under said melting peak below an onset of recrystallization temperature of said powder to a total area under said melting peak, is no more than about 2.7%.

7. A method of producing a three-dimensional object, comprising the steps of:
   applying a layer of a powder at a target surface, said powder comprised of a semi-crystalline organic polymer, said powder having a melting peak and a recrystallization peak, as shown in differential scanning calorimetry traces, which show little overlap when measured at a scanning rate of 10°–20° C./minute, and wherein said polymer is selected from the group consisting of copolymers of nylons, acetals, ethylenes, and propylenes;
   directing energy at selected locations of said layer corresponding to the cross-section of the object to be formed in said layer to sinter said powder thereat; and
   repeating said applying and directing steps to form the object in layerwise fashion.

8. The method of claim 7 further comprising the step of removing unsintered powder from said object.

9. The method of claim 7 wherein said overlap is no more than about 13° C.

10. The method of claim 9 wherein said polymer is SC 912.

11. The method of claim 7 wherein said overlap is no more than about 11° C.

12. The method of claim 7 wherein said overlap, expressed as a percentage ratio of an area under said melting peak below an onset of recrystallization temperature of said powder to a total area under said melting peak, is no more than about 6.2%.

13. The method of claim 12 wherein said polymer is SC 912.

14. The method of claim 7 wherein said overlap, expressed as a percentage ratio of an area under said melting peak below an onset of recrystallization temperature of said powder to a total area under said melting peak, is no more than about 2.7%.

15. A method of producing a three-dimensional object, comprising the steps of:
   applying a layer of a powder at a target surface, said powder comprised of a semi-crystalline organic polymer, said powder having a melting peak and a recrystallization peak, as shown in differential scanning calorimetry traces, which show little overlap when measured at a scanning rate of 10°–20° C./minute, and wherein said polymer is selected from the group consisting of branched polyethylene and branched polypropylene;
   directing energy at selected locations of said layer corresponding to the cross-section of the object to be formed in said layer to sinter said powder thereat; and
   repeating said applying and directing steps to form the object in layerwise fashion.

16. The method of claim 15 further comprising the step of removing unsintered powder from said object.

17. The method of claim 15 wherein said overlap is no more than about 13° C.

18. The method of claim 15 wherein said overlap is no more than about 11° C.

19. The method of claim 15 wherein said overlap, expressed as a percentage ratio of an area under said melting peak below an onset of recrystallization temperature of said powder to a total area under said melting peak, is no more than about 6.2%.

20. The method of claim 15 wherein said overlap, expressed as a percentage ratio of an area under said melting peak below an onset of recrystallization temperature of said powder to a total area under said melting peak, is no more than about 2.7%.

21. A method of producing a three-dimensional object, comprising the steps of:
   applying a layer of a powder at a target surface, said powder comprised of a semi-crystalline organic polymer, said powder having a melting peak and a recrystallization peak, as shown in differential scanning calorimetry traces, which show little overlap when measured at a scanning rate of 10°–20° C./minute, and wherein said polymer is selected from the group consisting of branched polyethylene copolymers and branched polypropylene copolymers;
   directing energy at selected locations of said layer corresponding to the cross-section of the object to be formed in said layer to sinter said powder thereat; and
   repeating said applying and directing steps to form the object in layerwise fashion.

22. The method of claim 21 further comprising the step of removing unsintered powder from said object.

23. The method of claim 21 wherein said overlap is no more than about 13° C.

24. The method of claim 21 wherein said overlap is no more than about 11° C.

25. The method of claim 24 wherein said polymer is Affinity SM-1300.

26. The method of claim 21 wherein said overlap, expressed as a percentage ratio of an area under said melting peak below an onset of recrystallization temperature of said powder to a total area under said melting peak, is no more than about 6.2%.

27. The method of claim 21 wherein said overlap, expressed as a percentage ratio of an area under said melting peak below an onset of recrystallization temperature of said powder to a total area under said melting peak, is no more than about 2.7%.

28. The method of claim 27 wherein said polymer is Affinity SM-1300.

29. A laser sintered article, comprising a semi-crystalline organic polymer powder laser sintered to form said article, said powder having a melting peak and a recrystallization peak, as shown in differential scanning calorimetry traces, which show little overlap when measured at a scanning rate of 10°–20° C./minute, and wherein said polymer is selected from the group consisting of nylon, polyacetal, polypropylene, polyethylene, and ionomers.

30. The laser sintered article of claim 29 wherein said article has a density of at least about 80% of the density of a compression molded part of said powder.

31. The laser sintered article of claim 30 wherein said density is in the range from about 80% to about 95% of the density of a compression molded part of said powder.

32. The laser sintered article of claim 29 wherein said overlap is no more than about 13° C.

33. The laser sintered article of claim 29 wherein said overlap is no more than about 11° C.

34. The laser sintered article of claim 29 wherein said overlap, expressed as a percentage ratio of an area under said melting peak below an onset of recrystallization temperature of said powder to a total area under said melting peak, is no more than about 6.2%.

35. The laser sintered article of claim 29 wherein said overlap, expressed as a percentage ratio of an area under said melting peak below an onset of recrystallization temperature of said powder to a total area under said melting peak, is no more than about 2.7%.

36. A laser sintered article, comprising a semi-crystalline organic polymer powder laser sintered to form said article, said powder having a melting peak and a recrystallization peak, as shown in differential scanning calorimetry traces, which show little overlap when measured at a scanning rate of 10°–20° C./minute, and wherein said polymer is selected from the group consisting of copolymers of nylons, acetals, ethylenes, and propylenes.

37. The laser sintered article of claim 36 wherein said article has a density of at least about 80% of the density of a compression molded part of said powder.

38. The laser sintered article of claim 37 wherein said density is in the range from about 80% to about 95% of the density of a compression molded part of said powder.

39. The laser sintered article of claim 36 wherein said overlap is no more than about 13° C.

40. The laser sintered article of claim 39 wherein said polymer is SC 912.

41. The laser sintered article of claim 36 wherein said overlap is no more than about 11° C.

42. The laser sintered article of claim 36 wherein said overlap, expressed as a percentage ratio of an area under said melting peak below an onset of recrystallization temperature of said powder to a total area under said melting peak, is no more than about 6.2%.

43. The laser sintered article of claim 42 wherein said polymer is SC 912.

44. The laser sintered article of claim 36 wherein said overlap, expressed as a percentage ratio of an area under said melting peak below an onset of recrystallization temperature of said powder to a total area under said melting peak, is no more than about 2.7%.

45. A laser sintered article, comprising a semi-crystalline organic polymer powder laser sintered to form said article, said powder having a melting peak and a recrystallization peak, as shown in differential scanning calorimetry traces, which show little overlap when measured at a scanning rate of 10°–20° C./minute, and wherein said polymer is selected from the group consisting of branched polyethylene and branched polypropylene.

46. The laser sintered article of claim 45 wherein said article has a density of at least about 80% of the density of a compression molded part of said powder.

47. The laser sintered article of claim 46 wherein said density is in the range from about 80% to about 95% of the density of a compression molded part of said powder.

48. The laser sintered article of claim 45 wherein said overlap is no more than about 13° C.

49. The laser sintered article of claim 45 wherein said overlap is no more than about 11° C.

50. The laser sintered article of claim 45 wherein said overlap, expressed as a percentage ratio of an area under said melting peak below an onset of recrystallization temperature of said powder to a total area under said melting peak, is no more than about 6.2%.

51. The laser sintered article of claim 45 wherein said overlap, expressed as a percentage ratio of an area under said melting peak below an onset of recrystallization temperature of said powder to a total area under said melting peak, is no more than about 2.7%.

52. A laser sintered article, comprising a semi-crystalline organic polymer powder laser sintered to form said article, said powder having a melting peak and a recrystallization peak, as shown in differential scanning calorimetry traces, which show little overlap when measured at a scanning rate of 10°–20° C./minute, and wherein said polymer is selected from the group consisting of branched polyethylene copolymers and branched polypropylene copolymers.

53. The laser sintered article of claim 52 wherein said article has a density of at least about 80% of the density of a compression molded part of said powder.

54. The laser sintered article of claim 53 wherein said density is in the range from about 80% to about 95% of the density of a compression molded part of said powder.

55. The laser sintered article of claim 52 wherein said overlap is no more than about 13° C.

56. The laser sintered article of claim 52 wherein said overlap is no more than about 11° C.

57. The laser sintered article of claim 56 wherein said polymer is Affinity SM-1300.

58. The laser sintered article of claim 52 wherein said overlap, expressed as a percentage ratio of an area under said melting peak below an onset of recrystallization temperature of said powder to a total area under said melting peak, is no more than about 6.2%.

59. The laser sintered article of claim 52 wherein said overlap, expressed as a percentage ratio of an area under said melting peak below an onset of recrystallization temperature of said powder to a total area under said melting peak, is no more than about 2.7%.

60. The laser sintered article of claim 59 wherein said polymer is Affinity SM-1300.

61. A three-dimensional object formed by the method of claim 2.

62. A three-dimensional object formed by the method of claim 8.

63. A three-dimensional object formed by the method of claim 16.

64. A three-dimensional object formed by the method of claim 22.

65. A method of producing a three-dimensional object, comprising the steps of:
  applying a layer of a powder at a target surface, said powder comprised of a semi-crystalline organic polymer, said powder having a melting peak and a recrystallization peak, as shown in differential scanning calorimetry traces, which do not overlap when measured at a scanning rate of 10°–20° C./minute, and wherein said polymer is selected from the group consisting of branched polyethylene copolymers and branched polypropylene copolymers;
  directing energy at selected locations of said layer corresponding to the cross-section of the object to be formed in said layer to sinter said powder thereat; and
  repeating said applying and directing steps to form the object in layerwise fashion.

66. The method of claim 65 further comprising the step of removing unsintered powder from said object.

67. A laser sintered article, comprising a semi-crystalline organic polymer powder laser sintered to form said article, said powder having a melting peak and a recrystallization peak, as shown in differential scanning calorimetry traces, which do not overlap when measured at a scanning rate of 10°–20° C./minute, and wherein said polymer is selected from the group consisting of branched polyethylene copolymers and branched polypropylene copolymers.

68. The laser sintered article of claim 67 wherein said article has a density of at least about 80% of the density of a compression molded part of said powder.

69. The laser sintered article of claim 68 wherein said density is in the range from about 80% to about 95% of the density of a compression molded part of said powder.

70. A three-dimensional object formed by the method of claim 66.

* * * * *